US012793283B2

(12) United States Patent
Wang

(10) Patent No.: US 12,793,283 B2
(45) Date of Patent: Nov. 10, 2026

(54) NEURAL-NETWORK POST-FILTER PURPOSES WITH DOWNSAMPLING CAPABILITIES

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 19/055,295

(22) Filed: Feb. 17, 2025

(65) Prior Publication Data

US 2025/0218051 A1 Jul. 3, 2025

Related U.S. Application Data

(63) Continuation of application No. PCT/US2023/030280, filed on Aug. 15, 2023.

(60) Provisional application No. 63/398,701, filed on Aug. 17, 2022.

(51) Int. Cl.

| | |
|---|---|
| ***G06T 9/00*** | (2006.01) |
| ***G06T 5/20*** | (2006.01) |
| ***G06T 5/60*** | (2024.01) |
| ***H04N 19/70*** | (2014.01) |
| ***H04N 19/86*** | (2014.01) |

(52) U.S. Cl.

CPC ................ *G06T 9/002* (2013.01); *G06T 5/20* (2013.01); *G06T 5/60* (2024.01); *H04N 19/70* (2014.11); *H04N 19/86* (2014.11); *G06T 2207/10016* (2013.01); *G06T 2207/20084* (2013.01)

(58) Field of Classification Search

CPC ............. G06T 9/002; G06T 5/20; G06T 5/60; G06T 2207/10016; G06T 2207/20084; H04N 19/70; H04N 19/86; H04N 19/117; H04N 19/186; H04N 19/59; G06N 3/04

See application file for complete search history.

(56) References Cited

U.S. PATENT DOCUMENTS

2025/0211799 A1* 6/2025 Yin ...................... H04N 19/117
2025/0378588 A1* 12/2025 Deshpande ............. G06T 9/002

FOREIGN PATENT DOCUMENTS

WO 2022128105 A1 6/2022

OTHER PUBLICATIONS

"Series H: Audiovisual and Multimedia Systems Infrastructure of audiovisual services—Coding of moving video High efficiency video coding," Recommendation ITU-T H.265 | ISO/IEC 23008-2 (in force edition), Apr. 2013, 317 pages.

(Continued)

*Primary Examiner* — James M Pontius
(74) *Attorney, Agent, or Firm* — Conley Rose, P.C.

(57) ABSTRACT

A method for processing media data is disclosed. In an embodiment, the method includes determining a value of a neural-network post-filter characteristics (NNPFC) purpose (nnpfc_purpose) in a NNPFC supplemental enhancement information (SEI) message, wherein the nnpfc_purpose is configured to be set to include output picture size downsampling, and wherein at least one of (1) an output picture width is not equal to an input picture width and (2) an output picture height is not equal to an input picture height; and performing a conversion between a visual media data and a bitstream based on the nnpfc_purpose.

20 Claims, 6 Drawing Sheets

(56) References Cited

OTHER PUBLICATIONS

Document: JVET-G1001-v1, Chen, J., et al., "Algorithm description of Joint Exploration Test Model 7 (JEM 7)," Joint Video Exploration Team (JVET) ofITU-T SG 16 WP 3 and 1S0/IEC JTC 1/SC 29/WG 11 7th Meeting: Torino, IT, Jul. 13-21, 2017, 48 pages.
"Series H: Audiovisual and Multimedia Systems Infrastructure of audiovisual services—Coding of moving video Versatile video coding," Rec. ITU-T H.266 | ISO/IEC 23090-3, Aug. 2020, 516 pages.
"Series H: Audiovisual and Multimedia Systems Infrastructure of audiovisual services—Coding of moving video Versatile supplemental enhancement information messages for coded video bitstreams," Recommendation ITU-T H.274 | ISO/IEC 23002-7, Aug. 2020, 86 pages.
Document: JVET-AA2006-v2, Mccarthy, S. et al., "Additional SEI messages for VSEI (Draft 2)," Joint Video Experts Team (JVET) of ITU-T SG 16 WP 3 and ISO/IEC JTC 1/SC 29 27th Meeting, by teleconference, Jul. 13-22, 2022, 18 pages.
Hannuksela, M., et al., "AI boosts Versatile Video Coding," Aug. 14, 2023, 4 pages.
International Search Report from PCT Application No. PCT/US2023/030280 dated Nov. 6, 2023, 8 pages.

* cited by examiner

NEURAL-NETWORK POST-FILTER PURPOSES WITH DOWNSAMPLING CAPABILITIES

CROSS-REFERENCE TO RELATED APPLICATIONS

This application is a continuation of International Patent Application No. PCT/US2023/030280, filed on Aug. 15, 2023, which claims the benefit of U.S. Provisional Patent Application No. 63/398,701 filed Aug. 17, 2022, both of which are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining a value of a neural-network post-filter characteristics (NNPFC) purpose (nnpfc_purpose) in a NNPFC supplemental enhancement information (SEI) message, wherein the nnpfc_purpose is configured to be set to include output picture size downsampling, and wherein at least one of (1) an output picture width is not equal to an input picture width and (2) an output picture height is not equal to an input picture height; and performing a conversion between a visual media data and a bitstream based on the nnpfc_purpose.

Optionally, in any of the preceding aspects, another implementation of the aspect provides that the output picture width is less than the input picture width, wherein the output picture height is less than the input picture height, or both. Optionally, in any of the preceding aspects, another implementation of the aspect provides that the input picture width is referred to as a cropped width and the input picture height is referred to as a cropped height. Optionally, in any of the preceding aspects, another implementation of the aspect provides that the nnpfc_purpose is configured to be set to indicate chroma format downsampling without changing an output picture size.

Optionally, in any of the preceding aspects, another implementation of the aspect provides that the chroma format downsampling comprises downsampling from a 4:4:4 chroma format to a 4:2:2 chroma format or a 4:2:0 chroma format. Optionally, in any of the preceding aspects, another implementation of the aspect provides that the chroma format downsampling comprises downsampling from a 4:2:2 chroma format to a 4:2:0 chroma format.

Optionally, in any of the preceding aspects, another implementation of the aspect provides that the nnpfc_purpose is configured to be set to indicate both the output picture size downsampling and the chroma format downsampling, wherein the output picture width is decreased relative to the input picture width, the output picture height is decreased relative to the input picture height, or both, and wherein the chroma format downsampling comprises downsampling from the 4:4:4 chroma format to the 4:2:2 chroma format, downsampling from the 4:4:4 chroma format to the 4:2:0 chroma format, or downsampling from the 4:2:2 chroma format to the 4:2:0 chroma format.

Optionally, in any of the preceding aspects, another implementation of the aspect provides that the nnpfc_purpose is configured to be set to indicate both the output picture size downsampling and chroma format upsampling, wherein the output picture width is decreased relative to the input picture width, the output picture height is decreased relative to the input picture height, or both, and wherein the chroma format upsampling comprises upsampling from the 4:2:0 chroma format to the 4:2:2 chroma format, upsampling from the 4:2:0 chroma format to the 4:4:4 chroma format, or upsampling from the 4:2:2 chroma format to the 4:4:4 chroma format.

Optionally, in any of the preceding aspects, another implementation of the aspect provides that the nnpfc_purpose is configured to be set to indicate both the output picture size upsampling chroma format downsampling, wherein the output picture width is increased relative to the input picture width, the output picture height is increased relative to the input picture height, or both, and wherein the chroma format downsampling comprises downsampling from the 4:4:4 chroma format to the 4:2:2 chroma format, downsampling from the 4:4:4 chroma format to the 4:2:0 chroma format, or downsampling from the 4:2:2 chroma format to the 4:2:0 chroma format.

Optionally, in any of the preceding aspects, another implementation of the aspect provides that the NNPFC SEI message includes a chroma format indicator (ChromaFormatIdc), wherein a value of the nnpfc_purpose does not indicate a purpose that involves changing the chroma format when the ChromaFormatIdc is equal to 0, and wherein the ChromaFormatIdc is equal to 0 indicates an input chroma format is monochrome.

Optionally, in any of the preceding aspects, another implementation of the aspect provides that the NNPFC SEI message includes a chroma format indicator (ChromaFormatIdc), wherein a value of the nnpfc_purpose does not indicate a purpose that involves the chroma format downsampling when the ChromaFormatIdc is equal to 1, and wherein the ChromaFormatIdc is equal to 1 indicates an input chroma format is the 4:2:0 chroma format.

Optionally, in any of the preceding aspects, another implementation of the aspect provides that the NNPFC SEI message includes a chroma format indicator (ChromaFormatIdc), wherein a value of the nnpfc_purpose does not indicate a purpose that involves chroma format upsampling when the ChromaFormatIdc is equal to 3, and wherein the ChromaFormatIdc is equal to 3 indicates an input chroma format is the 4:4:4 chroma format.

Optionally, in any of the preceding aspects, another implementation of the aspect provides that the bitstream includes an indication to indicate whether a variable output chroma component block width (outSubWidthC) is derived to be equal to 2 or 1 for purposes involving the chroma format upsampling regardless of whether the output picture size is changed.

Optionally, in any of the preceding aspects, another implementation of the aspect provides that the bitstream includes an indication to indicate whether a variable output chroma component block height (outSubHeightC) is derived to be equal to 2 or 1 for purposes involving the chroma format downsampling regardless of whether the output picture size is changed.

Optionally, in any of the preceding aspects, another implementation of the aspect provides that the bitstream includes an indication to indicate an absolute increase to a width and an absolute increase to a height of a luma sample array of a picture resulting from application of a post-processing filter to a cropped decoded output picture for purposes involving changing the output picture size.

Optionally, in any of the preceding aspects, another implementation of the aspect provides that the absolute increase to the width and the absolute increase to the height are specified using coded unsigned integer variable (ue(v)) syntax.

Optionally, in any of the preceding aspects, another implementation of the aspect provides that a value of the absolute increase to the width of the luma sample array shall be in the range of 0 to input output picture width (CroppedWidth)*M−1, inclusive, where M is an integer greater than 0. Optionally, in any of the preceding aspects, another implementation of the aspect provides that a value of M is equal to 15. Optionally, in any of the preceding aspects, another implementation of the aspect provides that a value of M is equal to 1, 3, 7, 15, 31, 63, 127, or 255.

Optionally, in any of the preceding aspects, another implementation of the aspect provides that a value of the absolute increase to the height of the luma sample array shall be in the range of 0 to input output picture height (CroppedHeight)*N−1, inclusive, where N is an integer greater than 0. Optionally, in any of the preceding aspects, another implementation of the aspect provides that a value of N is equal to 15. Optionally, in any of the preceding aspects, another implementation of the aspect provides that a value of N is 1, 3, 7, 15, 31, 63, 127, or 255.

Optionally, in any of the preceding aspects, another implementation of the aspect provides that a value of a width of a luma sample array of a picture resulting from applying a post-processing filter to a cropped decoded output picture is derived to be equal to a sum of CroppedWidth and a value of the absolute increase to the width for purposes involving output picture size upsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size upsampling.

Optionally, in any of the preceding aspects, another implementation of the aspect provides that a value of a width of a luma sample array of a picture resulting from applying a post-processing filter to a cropped decoded output picture is derived to be equal to a sum of CroppedWidth and a value of the absolute increase to the width for purposes involving output picture size downsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size downsampling.

Optionally, in any of the preceding aspects, another implementation of the aspect provides that the value of the width of the luma sample array and the value of the height of the luma sample array are both greater than zero. Optionally, in any of the preceding aspects, another implementation of the aspect provides that the value of the width of the luma sample array is greater than or equal to the CroppedWidth/(M+1), where M is equal to 1, 3, 7, 15, 31, 63, 127, or 255. Optionally, in any of the preceding aspects, another implementation of the aspect provides that the value of the width of the luma sample array is greater than or equal to the CroppedHeight/(N+1), where N is equal to 1, 3, 7, 15, 31, 63, 127, or 255.

Optionally, in any of the preceding aspects, another implementation of the aspect provides that a value of a width of a luma sample array of a picture resulting by applying a post-processing filter to a cropped decoded output picture is derived to be equal to CroppedWidth for purposes not involving changing output picture size, and wherein a value of a height of a luma sample array of the picture resulting by applying the post-processing filter to the cropped decoded output picture is derived to be equal to the CroppedHeight for purposes not involving changing output picture size.

Optionally, in any of the preceding aspects, another implementation of the aspect provides that the bitstream includes an indication to indicate increases to a width and a height of a luma sample array of a picture resulting by applying a post-processing filter to a cropped decoded output picture for purposes involving changing an output picture size.

Optionally, in any of the preceding aspects, another implementation of the aspect provides that the increase to the width and the increase to the height are specified using coded unsigned integer variable (ue(v)) syntax. Optionally, in any of the preceding aspects, another implementation of the aspect provides that the increase to the width is in the range of −CroppedWidth+width value (ValW) to CroppedWidth*M−1, inclusive, where M is an integer greater than 0. Optionally, in any of the preceding aspects, another implementation of the aspect provides that a value of the width value (ValW) is 1.

Optionally, in any of the preceding aspects, another implementation of the aspect provides that a value of the width value (ValW) is equal to CroppedWidth/(M+1). Optionally, in any of the preceding aspects, another implementation of the aspect provides that a value of M is equal to 15. Optionally, in any of the preceding aspects, another implementation of the aspect provides that a value of M is 1, 3, 7, 15, 31, 63, 127, or 255.

Optionally, in any of the preceding aspects, another implementation of the aspect provides that the increase to the height is in the range of −CroppedHeight+height value (ValH) to CroppedHeight*N−1, inclusive, where N is an integer greater than 0. Optionally, in any of the preceding aspects, another implementation of the aspect provides that a value of the width value (ValW) is 1. Optionally, in any of the preceding aspects, another implementation of the aspect provides that a value of the width value (ValW) is equal to CroppedWidth/(M+1). Optionally, in any of the preceding aspects, another implementation of the aspect provides that a value of M is equal to 15. Optionally, in any of the preceding aspects, another implementation of the aspect provides that a value of M is 1, 3, 7, 15, 31, 63, 127, or 255.

Optionally, in any of the preceding aspects, another implementation of the aspect provides that a value of a width of a luma sample array of a picture resulting by applying a post-processing filter to a cropped decoded output picture is derived to be equal to a sum of CroppedWidth and a value of the increase to the width for purposes involving changing output picture size, and wherein a value of a height of the luma sample array of the picture resulting by applying the post-processing filter to the cropped decoded output picture is derived to be equal to a sum of CroppedHeight and a value of the increase to the height for purposes involving changing output picture size.

Optionally, in any of the preceding aspects, another implementation of the aspect provides that a value of a width of a luma sample array of a picture resulting by applying a post-processing filter to a cropped decoded output picture is derived to be equal to CroppedWidth for purposes not involving changing output picture size, and wherein a value of a height of the luma sample array of the picture resulting by applying the post-processing filter to a cropped decoded output picture is derived to be equal to CroppedHeight for purposes not involving changing output picture size.

Optionally, in any of the preceding aspects, another implementation of the aspect provides that the conversion includes encoding the visual media data into the bitstream.

Optionally, in any of the preceding aspects, another implementation of the aspect provides that the conversion includes decoding the visual media data from the bitstream.

A second aspect relates to an apparatus for processing video data comprising: a processor; and a non-transitory memory with instructions thereon, wherein the instructions upon execution by the processor, cause the processor to perform any of the preceding aspects.

A third aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises any of the disclosed methods.

A fifth aspect relates to a method for storing a bitstream of a video comprising any of the disclosed methods.

A sixth aspect relates to a method, apparatus, or system described in the present disclosure.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
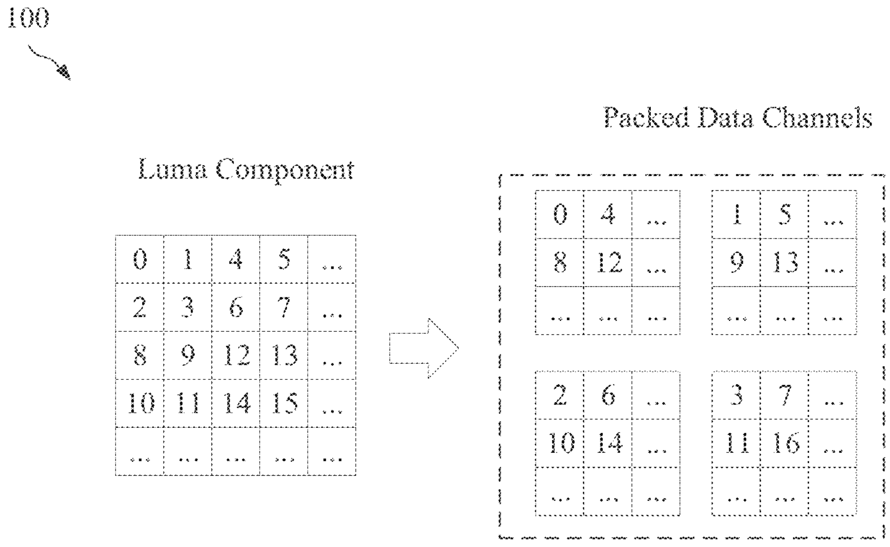
FIG. 1 is an example illustration of luma data channels of nnpfc_inp_order_idc equal to 3.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed embodiments. As such, the embodiments described herein are applicable to other video codec protocols and designs also. In the present disclosure, editing changes are shown to text by bold italics indicating cancelled text and bold indicating added text, with respect to the Versatile Video Coding (VVC) specification and/or the versatile Supplemental Enhancement Information (VSEI) standard.

1. INITIAL DISCUSSION

This disclosure is related to image and/or video coding technologies. Specifically, this disclosure is related to the definition and signaling of purposes with downsampling capabilities for neural-network post-processing filters signaled in a video bitstream. Downsampling herein can be chroma format downsampling, e.g., from the 4:4:4 chroma format to the 4:2:2 or 4:4:4 chroma format, or from the 4:2:2 chroma format to the 4:2:0 chroma format. Downsampling herein can also be decreasing either or both of the picture width and the picture height. The examples may be applied individually or in various combinations, for video bitstreams coded by any codec, such as the VVC standard and/or the versatile SEI messages for coded video bitstreams (VSEI) standard.

2. ABBREVIATIONS

Adaptation Parameter Set (APS), Access Unit (AU), Coded Layer Video Sequence (CLVS), Coded Layer Video Sequence Start (CLVSS), Cyclic Redundancy Check (CRC), Coded Video Sequence (CVS), Finite Impulse Response (FIR), Intra Random Access Point (IRAP), Network Abstraction Layer (NAL), Picture Parameter Set (PPS), Picture Unit (PU), Random Access Skipped Leading (RASL), Supplemental Enhancement Information (SEI), Step-wise Temporal Sublayer Access (STSA), Video Coding Layer (VCL), versatile supplemental enhancement information as described in Rec. ITU-T H.274|International Organization for Standardization (ISO)/International Electrotechnical Commission (IEC) 23002-7 (VSEI), Video Usability Information (VUI), versatile video coding as described in Rec. ITU-T H.266|ISO/IEC 23090-3 (VVC).

3. FURTHER DISCUSSION

3.1 Video Coding Standards

Video coding standards have evolved primarily through the development of the International Telecommunication Union (ITU) telecommunication standardization sector (ITU-T) and ISO/International Electrotechnical Commission (IEC) standards. The ITU-T produced H.261 and H.263, ISO/IEC produced motion picture experts group (MPEG)-1 and MPEG-4 Visual, and the two organizations jointly produced the H.262/MPEG-2 Video and H.264/MPEG-4 Advanced Video Coding (AVC) and H.265/high efficiency video coding (HEVC) [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by video coding experts group (VCEG) and MPEG jointly. Many methods have been adopted by JVET and put into the reference software named Joint Exploration Model (JEM) [2]. The JVET was renamed to be the Joint Video Experts Team (JVET) when the Versatile Video Coding (VVC) project officially started. VVC [3] is a coding standard, targeting at 50% bitrate reduction as compared to HEVC.

The Versatile Video Coding (VVC) standard (ITU-T H.266|ISO/IEC 23090-3) [3][4] and the associated Versatile Supplemental Enhancement Information (VSEI) standard (ITU-T H.274|ISO/IEC 23002-7) [4] is designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard developed by MPEG.

3.2 SEI Messages in General and in VVC and VSEI

An SEI messages assists in processes related to decoding, display, or other purposes. However, SEI messages are not required for constructing the luma or chroma samples by the decoding process. Conforming decoders are not required to process this information for output order conformance. Some SEI messages are required for checking bitstream conformance and for output timing decoder conformance. Other SEI messages are not required for check bitstream conformance.

Annex D of VVC specifies syntax and semantics for SEI message payloads for some SEI messages, and specifies the use of the SEI messages and VUI parameters for which the syntax and semantics are specified in ITU-T H.274|ISO/IEC 23002-7.

3.3 Signaling of Neural-Network Post-Filters

JVET-AA2006 [5] includes the specification of two SEI messages for signaling of neural-network post-filters, as follows.

8.28 Neural-Network Post-Filter Characteristics SEI Message

8.28.1 Neural-Network Post-Filter Characteristics SEI Message Syntax

```
                                                              Descriptor
nn_post_filter_characteristics( payloadSize ) {
  nnpfc_id                                                    ue(v)
  nnpfc_mode_idc                                              ue(v)
  nnpfc_purpose_and_formatting_flag                           u(1)
  if( nnpfc_purpose_and_formatting_flag ) {
    nnpfc_purpose                                             ue(v)
    if( nnpfc_purpose == 2 || nnpfc_purpose == 4 )
      nnpfc_out_sub_c_flag                                    u(1)
    if( nnpfc_purpose == 3 || nnpfc_purpose == 4 ) {
      nnpfc_pic_width_in_luma_samples                         ue(v)
      nnpfc_pic_height_in_luma_samples                        ue(v)
    }
    nnpfc_component_last_flag                                 u(1)
    nnpfc_inp_format_flag                                     u(1)
    if( nnpfc_inp_format_flag == 1 )
      nnpfc_inp_tensor_bitdepth_minus8                        ue(v)
    nnpfc_inp_order_idc                                       ue(v)
    nnpfc_auxiliary_inp_idc                                   ue(v)
    nnpfc_separate_colour_description_present_flag            u(1)
    if( nnpfc_separate_colour_description_present_
    flag ) {
      nnpfc_colour_primaries                                  u(8)
      nnpfc_transfer_characteristics                          u(8)
      nnpfc_matrix_coeffs                                     u(8)
    }
    nnpfc_out_format_flag                                     u(1)
    if( nnpfc_out_format_flag == 1 )
      nnpfc_out_tensor_bitdepth_minus8                        ue(v)
    nnpfc_out_order_idc                                       ue(v)
    nnpfc_constant_patch_size_flag                            u(1)
    nnpfc_patch_width_minus1                                  ue(v)
    nnpfc_patch_height_minus1                                 ue(v)
    nnpfc_overlap                                             ue(v)
    nnpfc_padding_type                                        ue(v)
    if( nnpfc_padding_type == 4 ){
      nnpfc_luma_padding_val                                  ue(v)
      nnpfc_cb_padding_val                                    ue(v)
      nnpfc_cr_padding_val                                    ue(v)
    }
    nnpfc_complexity_idc                                      ue(v)
    if( nnpfc_complexity_idc > 0 )
      nnpfc_complexity_element( nnpfc_complexity_idc )
    if( nnpfc_mode_idc == 2 ) {
      while( !byte_aligned( ) )
        nnpfc_reserved_zero_bit                               u(1)
      nnpfc_uri_tag[ i ]                                      st(v)
      nnpfc_uri[ i ]                                          st(v)
    }
  }
  /* filter specified or updated by ISO/IEC 15938-17
  bitstream */
  if( nnpfc_mode_idc == 1 ) {
    while( !byte_aligned( ) )
      nnpfc_reserved_zero_bit                                 u(1)
    for( i = 0; more_data_in_payload( ); i++ )
      nnpfc_payload_byte[ i ]                                 b(8)
  }
}
```

```
                                                              Descriptor
nnpfc_complexity_element( nnpfc_complexity_idc ) {
  if( nnpfc_complexity_idc == 1 ) {
    nnpfc_parameter_type_idc                                  u(2)
    if (nnpfc_parameter_type_idc ! = 2)
      nnpfc_log2_parameter_bit_length_minus3                  u(2)
    nnpfc_num_parameters_idc                                  u(6)
```

-continued

| | Descriptor |
|---|---|
| nnpfc__num__kmac__operations__idc | ue(v) |
| } | |
| } | |

8.28.2 Neural-Network Post-Filter Characteristics SEI Message Semantics

This SEI message specifies a neural network that may be used as a post-processing filter. The use of specified post-processing filters for specific pictures is indicated with neural-network post-filter activation SEI messages.

Use of this SEI message requires the definition of the following variables: —Cropped decoded output picture width and height in units of luma samples, denoted herein by CroppedWidth and CroppedHeight, respectively.

Luma sample array CroppedYPic[x][y] and chroma sample arrays CroppedCbPic[x][y] and CroppedCrPic [x][y], when present, of the cropped decoded output picture for vertical coordinates y and horizontal coordinates x, where the top-left corner of the sample array has coordinates y equal to 0 and x equal to 0·. —Bit depth BitDepthY for the luma sample array of the cropped decoded output picture. —Bit depth BitDepthC for the chroma sample arrays, if any, of the cropped decoded output picture. —A chroma format indicator, denoted herein by ChromaFormatIdc, as described in clause 7.3. —When nnpfc_auxiliary_inp_idc is equal to 1, a quantization strength value StrengthControlVal.

When this SEI message specifies a neural network that may be used as a post-processing filter, the semantics specify the derivation of the luma sample array FilteredYPic[x][y] and chroma sample arrays FilteredCbPic[x][y] and FilteredCrPic[x][y], as indicated by the value of nnpfc_out_order_idc, that contain the output of the post-processing filter. The variables SubWidthC and SubHeightC are derived from ChromaFormatIdc as specified by Table 2.

nnpfc_id contains an identifying number that may be used to identify a post-processing filter. The value of nnpfc_id shall be in the range of 0 to $2^{32}-2$, inclusive. Values of nnpfc_id from 256 to 511, inclusive, and from $2^{31}$ to $2^{32}-2$, inclusive, are reserved for future use by ITU-T|ISO/IEC. Decoders encountering a value of nnpfc_id in the range of 256 to 511, inclusive, or in the range of $2^{31}$ to $2^{32}-2$, inclusive, shall ignore it. nnpfc_mode_idc equal to 0 specifies that the post-processing filter associated with the nnpfc_id value is determined by external means not specified in this Specification. nnpfc_mode_idc equal to 1 specifies that the post-processing filter associated with the nnpfc_id value is a neural network represented by the ISO/IEC 15938-17 bitstream contained in this SEI message.

nnpfc_mode_idc equal to 2 specifies that the post-processing filter associated with the nnpfc_id value is a neural network identified by a specified tag Uniform Resource Identifier (URI) (nnpfc_uri_tag[i]) and neural network information URI (nnpfc_uri[i]). The value of nnpfc_mode_idc shall be in the range of 0 to 255, inclusive. Values of nnpfc_mode_idc greater than 2 are reserved for future specification by ITU-T|ISO/IEC and shall not be present in bitstreams conforming to this version of this Specification.

Decoders conforming to this version of this Specification shall ignore SEI messages that contain reserved values of nnpfc_mode_idc. nnpfc_purpose_and_formatting_flag equal to 0 specifies that no syntax elements related to the filter purpose, input formatting, output formatting, and complexity are present. nnpfc_purpose_and_formatting_flag equal to 1 specifies that syntax elements related to the filter purpose, input formatting, output formatting, and complexity are present. When nnpfc_mode_idc is equal to 1 and the current CLVS does not contain a preceding neural-network post-filter characteristics SEI message, in decoding order, that has the value of nnpfc_id equal to the value of nnpfc_id in this SEI message, nnpfc_purpose_and_formatting_flag shall be equal to 1.

When the current CLVS contains a preceding neural-network post-filter characteristics SEI message, in decoding order, that has the same value of nnpfc_id equal to the value of nnpfc_id in this SEI message, at least one of the following conditions shall apply: —This SEI message has nnpfc_mode_idc equal to 1 and nnpfc_purpose_and_formatting_flag equal to 0 in order to provide a neural network update. —This SEI message has the same content as the preceding neural-network post-filter characteristics SEI message. When this SEI message is the first neural-network post-filter characteristics SEI message, in decoding order, that has a particular nnpfc_id value within the current CLVS, it specifies a base post-processing filter that pertains to the current decoded picture and all subsequent decoded pictures of the current layer, in output order, until the end of the current CLVS. When this SEI message is not the first neural-network post-filter characteristics SEI message, in decoding order, that has a particular nnpfc_id value within the current CLVS, this SEI message pertains to the current decoded picture and all subsequent decoded pictures of the current layer, in output order, until the end of the current CLVS or the next neural-network post-filter characteristics SEI message having that particular nnpfc_id value, in output order, within the current CLVS.

nnpfc_purpose indicates the purpose of post-processing filter as specified in Table 20. The value of nnpfc_purpose shall be in the range of 0 to $2^{32}-2$, inclusive. Values of nnpfc_purpose that do not appear in Table 20 are reserved for future specification by ITU-T|ISO/IEC and shall not be present in bitstreams conforming to this version of this Specification. Decoders conforming to this version of this Specification shall ignore SEI messages that contain reserved values of nnpfc_purpose.

TABLE 20

Definition of nnpfc__purpose

| Value | Interpretation |
|---|---|
| 0 | Unknown or unspecified |
| 1 | Visual quality improvement |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |

NOTE 1—When a reserved value of nnpfc_purpose is taken into use in the future by ITU-T|ISO/IEC, the syntax of this SEI message could be extended with syntax elements whose presence is conditioned by nnpfc_purpose being equal to that value.

When SubWidthC is equal to 1 and SubHeightC is equal to 1, nnpfc_purpose shall not be equal to 2 or 4. nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1. When nnpfc_out_sub_c_flag is not present, outSubWidthC is inferred to be equal to SubWidthC and outSubHeightC is inferred to be equal to SubHeightC. If SubWidthC is equal to 2 and SubHeightC is equal to 1, nnpfc_out_sub_c_flag shall not be equal to 0.

nnpfc_pic_width_in_luma_samples and nnpfc_pic_height_in_luma_samples specify the width and height, respectively, of the luma sample array of the picture resulting by applying the post-processing filter identified by nnpfc_id to a cropped decoded output picture. When nnpfc_pic_width_in_luma_samples and nnpfc_pic_height_in_luma_samples are not present, they are inferred to be equal to CroppedWidth and CroppedHeight, respectively. nnpfc_component_last_flag equal to 0 specifies that the second dimension in the input tensor inputTensor to the post-processing filter and the output tensor outputTensor resulting from the post-processing filter is used for the channel. nnpfc_component_last_flag equal to 1 specifies that the last dimension in the input tensor inputTensor to the post-processing filter and the output tensor outputTensor resulting from the post-processing filter is used for the channel.

NOTE 2—The first dimension in the input tensor and in the output tensor is used for the batch index, which is a practice in some neural network frameworks. While the semantics of this SEI message use batch size equal to 1, it is up to the post-processing implementation to determine the batch size used as input to the neural network inference. NOTE 3—A colour component is an example of a channel.

nnpfc_inp_format_flag indicates the method of converting a sample value of the cropped decoded output picture to an input value to the post-processing filter. When nnpfc_inp_
format_flag is equal to 0, the input values to the post-processing filter are real numbers and the functions InpY and InpC are specified as follows:

$$InpY(x) = x \div ((1 \ll BitDepth_Y) - 1) \quad (75)$$

$$InpC(x) = x \div ((1 \ll BitDepth_C - 1) \quad (76)$$

When nnpfc_inp_format_flag is equal to 1, the input values to the post-processing filter are unsigned integer numbers and the functions InpY and InpC are specified as follows:

The variable inpTensorBitDepth is derived from the syntax element nnpfc_inp_tensor_bitdepth_minus8 as specified below. nnpfc_inp_tensor_bitdepth_minus8 plus 8 specifies the bit depth of luma sample values in the input integer tensor. The value of inpTensorBitDepth is derived as follows:

$$inpTensorBitDepth = \text{nnpfc\_inp\_tensor\_bitdepth\_minus8} + 8 \quad (78)$$

It is a requirement of bitstream conformance that the value of nnpfc_inp_tensor_bitdepth_minus8 shall be in the range of 0 to 24, inclusive.

nnpfc_auxiliary_inp_idc not equal to 0 specifies auxiliary input data is present in the input tensor of the neural-network post-filter. nnpfc_auxiliary_inp_idc equal to 0 indicates that auxiliary input data is not present in the input tensor. nnpfc_auxiliary_inp_idc equal to 1 specifies that auxiliary input data is derived as specified in Table 23. The value of nnpfc_auxiliary_inp_idc shall be in the range of 0 to 255, inclusive. Values of nnpfc_auxiliary_inp_idc greater than 1 are reserved for future specification by ITU-T|ISO/IEC and shall not be present in bitstreams conforming to this version of this Specification. Decoders conforming to this version of this Specification shall ignore SEI messages that contain reserved values of nnpfc_auxiliary_inp_idc.

nnpfc_separate_colour_description_present_flag equal to 1 indicates that a distinct combination of colour primaries, transfer characteristics, and matrix coefficients for the picture resulting from the post-processing filter is specified in the SEI message syntax structure. nnfpc_separate_colour_description_present_flag equal to 0 indicates that the combination of colour primaries, transfer characteristics, and matrix coefficients for the picture resulting from the post-processing filter is the same as indicated in VUI parameters for the CLVS.

nnpfc_colour_primaries has the same semantics as specified in clause 7.3 for the vui_colour_primaries syntax element, except as follows: —nnpfc_colour_primaries specifies the colour primaries of the picture resulting from applying the neural-network post-filter specified in the SEI message, rather than the colour primaries used for the CLVS. —When nnpfc_colour_primaries is not present in the neural-network post-filter characteristics SEI message, the value of nnpfc_colour_primaries is inferred to be equal to vui_colour_primaries. nnpfc_transfer_characteristics has the same semantics as specified in clause 7.3 for the vui_transfer_characteristics syntax element, except as follows: —nnpfc_transfer_characteristics specifies the transfer characteristics of the picture resulting from applying the neural-network

```
shift = BitDepthY − inpTensorBitDepth
if( inpTensorBitDepth >= BitDepthY)
  InpY( x ) = x << ( inpTensorBitDepth − BitDepthY )
else
InpY( x ) = Clip3(0, ( 1 << inpTensorBitDepth ) − 1, ( x + ( 1 << ( shift − 1 ) ) ) >> shift
)
     (77)
shift = BitDepthC − inpTensorBitDepth
if( inpTensorBitDepth >= BitDepthC )
  InpC( x ) = x << ( inpTensorBitDepth − BitDepthC )
else
InpC( x ) = Clip3(0, ( 1 << inpTensorBitDepth ) − 1, ( x + ( 1 << ( shift − 1 ) ) ) >> shift )
```

post-filter specified in the SEI message, rather than the transfer characteristics used for the CLVS. —When nnpfc_transfer_characteristics is not present in the neural-network post-filter characteristics SEI message, the value of nnpfc_transfer_characteristics is inferred to be equal to vui_transfer_characteristics.

nnpfc_matrix_coeffs has the same semantics as specified in clause 7.3 for the vui_matrix_coeffs syntax element, except as follows: —nnpfc_matrix_coeffs specifies the matrix coefficients of the picture resulting from applying the neural-network post-filter specified in the SEI message, rather than the matrix coefficients used for the CLVS. —When nnpfc_matrix_coeffs is not present in the neural-network post-filter characteristics SEI message, the value of nnpfc_matrix_coeffs is inferred to be equal to vui_matrix_coeffs. —The values allowed for nnpfc_matrix_coeffs are not constrained by the chroma format of the decoded video pictures that is indicated by the value of ChromaFormatIdc for the semantics of the VUI parameters. —When nnpfc_matrix_coeffs is equal to 0, nnpfc_out_order_idc shall not be equal to 1 or 3.

nnpfc_inp_order_idc indicates the method of ordering the sample arrays of a cropped decoded output picture as the input to the post-processing filter. Table 21 contains an informative description of nnpfc_inp_order_idc values. The semantics of nnpfc_inp_order_idc in the range of 0 to 3, inclusive, are specified in Table 23, which specifies a process for deriving the input tensors inputTensor for different values of nnpfc_inp_order_idc and a given vertical sample coordinate cTop and a horizontal sample coordinate cLeft specifying the top-left sample location for the patch of samples included in the input tensors. When the chroma format of the cropped decoded output picture is not 4:2:0, nnpfc_inp_order_idc shall not be equal to 3. The value of nnpfc_inp_order_idc shall be in the range of 0 to 255, inclusive. Values of nnpfc_inp_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_inp_order_idc.

FIG. 1 is an example illustration of luma data channels of nnpfc_inp_order_idc equal to 3 (informative).

A patch is a rectangular array of samples from a component (e.g., a luma or chroma component) of a picture. nnpfc_constant_patch_size_flag equal to 0 specifies that the post-processing filter accepts any patch size that is a positive integer multiple of the patch size indicated by nnpfc_patch_width_minus1 and nnpfc_patch_height_minus1 as input. When nnpfc_constant_patch_size_flag is equal to 0 the patch size width shall be less than or equal to CroppedWidth. When nnpfc_constant_patch_size_flag is equal to 0 the patch size height shall be less than or equal to CroppedHeight. nnpfc_constant_patch_size_flag equal to 1 specifies that the post-processing filter accepts exactly the patch size indicated by nnpfc_patch_width_minus1 and nnpfc_patch_height_minus1 as input.

nnpfc_patch_width_minus1+1, when nnpfc_constant_patch_size_flag equal to 1, specifies the horizontal sample counts of the patch size required for the input to the post-processing filter. When nnpfc_constant_patch_size_flag is equal to 0, any positive integer multiple of (nnpfc_patch_width_minus1+1) may be used as the horizontal sample counts of the patch size used for the input to the post-processing filter. The value of nnpfc_patch_width_minus1 shall be in the range of 0 to Min(32766, CroppedWidth−1), inclusive. nnpfc_patch_height_minus1+1, when nnpfc_constant_patch_size_flag equal to 1, specifies the vertical sample counts of the patch size required for the input to the post-processing filter. When nnpfc_constant_patch_size_flag is equal to 0, any positive integer multiple of (nnpfc_patch_height_minus1+1) may be used as the vertical sample counts of the patch size used for the input to the post-processing filter. The value of nnpfc_patch_height_minus1 shall be in the range of 0 to Min(32766, CroppedHeight−1), inclusive. nnpfc_overlap specifies the overlapping horizontal and vertical sample counts of adjacent input tensors of the post-processing filter. The value of nnpfc_overlap shall be in the range of 0 to 16383, inclusive.

The variables inpPatchWidth, inpPatchHeight, outPatchWidth, outPatchHeight, horCScaling, verCScaling, outPatchCWidth, outPatchCHeight, and overlapSize are derived as follows:

TABLE 21

Informative description of nnpfc__inp__order__idc values

| nnpfc__inp__order__idc | Description |
|---|---|
| 0 | If nnpfc__auxiliary__inp__idc is equal to 0, one luma matrix is present in the input tensor, thus the number of channels is 1. Otherwise, nnpfc__auxiliary__inp__idc is not equal to 0 and one luma matrix and one auxiliary input matrix are present, thus the number of channels is 2. |
| 1 | If nnpfc__auxiliary__inp__idc is equal to 0, two chroma matrices are present in the input tensor, thus the number of channels is 2. Otherwise, nnpfc__auxiliary__inp__idc is not equal to 0 and two chroma matrices and one auxiliary input matrix are present, thus the number of channels is 3. |
| 2 | If nnpfc__auxiliary__inp__idc is equal to 0, one luma and two chroma matrices are present in the input tensor, thus the number of channels is 3. Otherwise, nnpfc__auxiliary__inp__idc is not equal to 0 and one luma matrix, two chroma matrices and one auxiliary input matrix are present, thus the number of channels is 4. |
| 3 | If nnpfc__auxiliary__inp__idc is equal to 0, four luma matrices and two chroma matrices are present in the input tensor, thus the number of channels is 6. Otherwise, nnpfc__auxiliary__inp__idc is not equal to 0 and four luma matrices, two chroma matrices, and one auxiliary input matrix are present in the input tensor, thus the number of channels is 7. The luma channels are derived in an interleaved manner as illustrated in FIG. 12. This nnpfc__inp__order__idc can only be used when the chroma format is 4:2:0. |
| 4 . . . 255 | reserved |

$$inpPatchWidth = \text{nnpfc\_patch\_width\_minus1} + 1 \quad (79)$$

$$inpPatchHeight = \text{nnpfc\_patch\_height\_minus1} + 1$$

$$outPatchWidth = (\text{nnpfc\_pic\_width\_in\_luma\_samples} * inpPatchWidth)/CroppedWidth$$

$$outPatchHeight = (\text{nnpfc\_pic\_height\_in\_luma\_samples} * inpPatchHeight)/CroppedHeight$$

$$horCScaling = SubWidthC/outSubWidthC$$

$$verCScaling = SubHeightC/outSubHeightC$$

$$outPatchCWidth = outPatchWidth * horCScaling$$

$$outPatchCHeight = outPatchHeight * verCScaling$$

$$overlapSize = \text{nnpfc\_overlap}$$

It is a requirement of bitstream conformance that outPatchWidth*CroppedWidth shall be equal to nnpfc_pic_width_in_luma_samples*inpPatchWidth and outPatchHeight*CroppedHeight shall be equal to nnpfc_pic_height_in_luma_samples*inpPatchHeight.

nnpfc_padding_type specifies the process of padding when referencing sample locations outside the boundaries of the cropped decoded output picture as described in Table 22. The value of nnpfc_padding_type shall be in the range of 0 to 15, inclusive.

TABLE 22

Informative description of nnpfc_padding_type values

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | reserved |

nnpfc_luma_padding_val specifies the luma value to be used for padding when nnpfc_padding_type is equal to 4. nnpfc_cb_padding_val specifies the Cb value to be used for padding when nnpfc_padding_type is equal to 4. nnpfc_cr_padding_val specifies the Cr value to be used for padding when nnpfc_padding_type is equal to 4.

The function InpSampleVal(y, x, picHeight, picWidth, croppedPic) with inputs being a vertical sample location y, a horizontal sample location x, a picture height picHeight, a picture width picWidth, and sample array croppedPic returns the value of sampleVal derived as follows:

```
if( nnpfc_padding_type = = 0 )
if( y < 0 || x < 0 || y >= picHeight || x >= picWidth )
   sampleVal = 0
else
   sampleVal = croppedPic[ x ][ y ]       (80)
else if( nnpfc_padding_type = = 1 )
sampleVal = croppedPic[ Clip3( 0, picWidth − 1, x ) ][ Clip3( 0, picHeight − 1, y ) ]
else if( nnpfc_padding_type = = 2 )
sampleVal = croppedPic[ Reflect( picWidth − 1, x ) ][ Reflect( picHeight − 1, y ) ]
else if( nnpfc_padding_type = = 3 )
if(y >= 0 && y < picHeight)
   sampleVal = croppedPic[ Wrap( picWidth − 1, x ) ][ y ]
else if( nnpfc_padding_type = = 4 )
if( y < 0 || x < 0 || y >= picHeight || x >= picWidth )
   sampleVal[ 0 ] = nnpfc_luma_padding_val
      sampleVal[ 1 ] = nnpfc_cb_padding_val
   sampleVal[ 2 ] = nnpfc_cr_padding_val
else
   sampleVal = croppedPic[ x ][ y ]
```

TABLE 23

Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| 0 | for( yP = −overlapSize; yP < inpPatchHeight + overlapSize; yP++)<br>  for( xP = −overlapSize; xP < inpPatchWidth + overlapSize; xP++ ) {<br>    inpVal = InpY( InpSampleVal( cTop + yP, cLeft + xP, CroppedHeight,<br>        CroppedWidth, CroppedYPic ) )<br>    if( nnpfc_component_last_flag = = 0 )<br>      inputTensor[ 0 ][ 0 ][ yP + overlapSize ][ xP + overlapSize ] = inpVal<br>    else<br>      inputTensor[ 0 ][ yP + overlapSize ][ xP + overlapSize ][ 0 ] = inpVal<br>    if(nnpfc_auxiliary_inp_idc = = 1) {<br>      if( nnpfc_component_last_flag = = 0 )<br>        inputTensor[ 0 ][ 1 ][ yP + overlapSize ][ xP + overlapSize ] = 2(StrengthControlVal − 42)/6<br>      else<br>        inputTensor[ 0 ][ yP + overlapSize ][ xP + overlapSize ][ 1 ] = 2(StrengthControlVal − 42)/6<br>    }<br>  } |

TABLE 23-continued

Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| 1 | for( yP = −overlapSize; yP < inpPatchHeight + overlapSize; yP++)<br>for( xP = −overlapSize; xP < inpPatchWidth + overlapSize; xP++ ) {<br>inpCbVal = InpC( InpSampleVal( cTop + yP, cLeft + xP, CroppedHeight / SubHeightC, CroppedWidth / SubWidthC, CroppedCbPic ) )<br>inpCrVal = InpC( InpSampleVal( cTop + yP, cLeft + xP, CroppedHeight / SubHeightC, CroppedWidth / SubWidthC, CroppedCrPic ) )<br>if( nnpfc_component_last_flag = = 0 ) {<br>inputTensor[ 0 ][ 0 ][ yP + overlapSize ][ xP + overlapSize ] = inpCbVal<br>inputTensor[ 0 ][ 1 ][ yP + overlapSize ][ xP + overlapSize ] = inpCrVal<br>} else {<br>inputTensor[ 0 ][ yP + overlapSize ][ xP + overlapSize ][ 0 ] = inpCbVal<br>inputTensor[ 0 ][ yP + overlapSize ][ xP + overlapSize ][ 1 ] = inpCrVal<br>}<br>if(nnpfc_auxiliary_inp_idc = = 1) {<br>if( nnpfc_component_last_flag = = 0 )<br>inputTensor[ 0 ][ 2 ][ yP + overlapSize ][ xP + overlapSize ] = 2(StrengthControlVal − 42)/6<br>else<br>inputTensor[ 0 ][ yP + overlapSize ][ xP + overlapSize ][ 2 ] = 2(StrengthControlVal − 42)/6<br>}<br>} |
| 2 | for( yP = −overlapSize; yP < inpPatchHeight + overlapSize; yP++)<br>for( xP = −overlapSize; xP < inpPatchWidth + overlapSize; xP++ ) {<br>yY = cTop + yP<br>xY = cLeft + xP<br>yC = yY / SubHeightC<br>xC = xY / SubWidthC<br>inpYVal = InpY( InpSampleVal( yY, xY, CroppedHeight, CroppedWidth, CroppedYPic ) )<br>inpCbVal = InpC( InpSampleVal( yC, xC, CroppedHeight / SubHeightC, CroppedWidth / SubWidthC, CroppedCbPic ) )<br>inpCrVal = InpC( InpSampleVal( yC, xC, CroppedHeight / SubHeightC, CroppedWidth / SubWidthC, CroppedCrPic ) )<br>if( nnpfc_component_last_flag = = 0 ) {<br>inputTensor[ 0 ][ 0 ][ yP + overlapSize ][ xP + overlapSize ] = inpYVal<br>inputTensor[ 0 ][ 1 ][ yP + overlapSize ][ xP + overlapSize ] = inpCbVal<br>inputTensor[ 0 ][ 2 ][ yP + overlapSize ][ xP + overlapSize ] = inpCrVal<br>} else {<br>inputTensor[ 0 ][ yP + overlapSize ][ xP + overlapSize ][ 0 ] = inpYVal<br>inputTensor[ 0 ][ yP + overlapSize ][ xP + overlapSize ][ 1 ] = inpCbVal<br>inputTensor[ 0 ][ yP + overlapSize ][ xP + overlapSize ][ 2 ] = inpCrVal<br>}<br>if(nnpfc_auxiliary_inp_idc = = 1) {<br>if( nnpfc_component_last_flag = = 0 )<br>inputTensor[ 0 ][ 3 ][ yP + overlapSize ][ xP + overlapSize ] = 2(StrengthControlVal − 42)/6<br>else<br>inputTensor[ 0 ][ yP + overlapSize ][ xP + overlapSize ][ 3 ] = 2(StrengthControlVal − 42)/6<br>}<br>} |
| 3 | for( yP = −overlapSize; yP < inpPatchHeight + overlapSize; yP++)<br>for( xP = −overlapSize; xP < inpPatchWidth + overlapSize; xP++ ) {<br>yTL = cTop + yP * 2<br>xTL = cLeft + xP * 2<br>yBR = yTL + 1<br>xBR = xTL + 1<br>yC = cTop / 2 + yP<br>xC = cLeft / 2 + xP |

TABLE 23-continued

Process for deriving the input tensors inputTensor for a given vertical sample coordinate cTop and a horizontal sample coordinate cLeft specifying the top-left sample location for the patch of samples included in the input tensors

| nnpfc_inp_order_idc | Process DeriveInputTensors( ) for deriving input tensors |
|---|---|
| | inpTLVal = InpY( InpSampleVal( yTL, xTL, CroppedHeight, CroppedWidth, CroppedYPic ) )<br>inpTRVal = InpY( InpSampleVal( yTL, xBR, CroppedHeight, CroppedWidth, CroppedYPic ) )<br>inpBLVal = InpY( InpSampleVal( yBR, xTL, CroppedHeight, CroppedWidth, CroppedYPic ) )<br>inpBRVal = InpY( InpSampleVal( yBR, xBR, CroppedHeight, CroppedWidth, CroppedYPic ) )<br>inpCbVal = InpC( InpSampleVal( yC, xC, CroppedHeight / 2, CroppedWidth / 2, CroppedCbPic ) )<br>inpCrVal = InpC( InpSampleVal( yC, xC, CroppedHeight / 2, CroppedWidth / 2, CroppedCrPic ) )<br>if( nnpfc_component_last_flag = = 0 ) {<br>inputTensor[ 0 ][ 0 ][ yP + overlapSize ][ xP + overlapSize ] = inpTLVal<br>inputTensor[ 0 ][ 1 ][ yP + overlapSize ][ xP + overlapSize ] = inpTRVal<br>inputTensor[ 0 ][ 2 ][ yP + overlapSize ][ xP + overlapSize ] = inpBLVal<br>inputTensor[ 0 ][ 3 ][ yP + overlapSize ][ xP + overlapSize ] = inpBRVal<br>inputTensor[ 0 ][ 4 ][ yP + overlapSize ][ xP + overlapSize ] = inpCbVal<br>inputTensor[ 0 ][ 5 ][ yP + overlapSize ][ xP + overlapSize ] = inpCrVal<br>inputTensor[ 0 ][ 6 ][ yP + overlapSize ][ xP + overlapSize ] = 2(StrengthControlVal − 42)/6<br>} else {<br>inputTensor[ 0 ][ yP + overlapSize ][ xP + overlapSize ][ 0 ] = inpTLVal<br>inputTensor[ 0 ][ yP + overlapSize ][ xP + overlapSize ][ 1 ] = inpTRVal<br>inputTensor[ 0 ][ yP + overlapSize ][ xP + overlapSize ][ 2 ] = inpBLVal<br>inputTensor[ 0 ][ yP + overlapSize ][ xP + overlapSize ][ 3 ] = inpBRVal<br>inputTensor[ 0 ][ yP + overlapSize ][ xP + overlapSize ][ 4 ] = inpCbVal<br>inputTensor[ 0 ][ yP + overlapSize ][ xP + overlapSize ][ 5 ] = inpCrVal }<br>if(nnpfc_auxiliary_inp_idc = = 1) {<br>if( nnpfc_component_last_flag = = 0 )<br>inputTensor[ 0 ][ 6 ][ yP + overlapSize ][ xP + overlapSize ] = 2(StrengthControlVal − 42)/6<br>else<br>inputTensor[ 0 ][ yP + overlapSize ][ xP + overlapSize ][ 6 ] = 2(StrengthControlVal − 42)/6<br>}<br>} |
| 4..255 | reserved |

nnpfc_complexity_idc greater than 0 specifies that one or more syntax elements that indicate the complexity of the post-processing filter associated with the nnpfc_id may be present. nnpfc_complexity_idc equal to 0 specifies that no syntax element that indicates the complexity of the post-processing filter associated with the nnpfc_id is present. The value nnpfc_complexity_idc shall be in the range of 0 to 255, inclusive. Values of nnpfc_complexity_idc greater than 1 are reserved for future specification by ITU-T|ISO/IEC and shall not be present in bitstreams conforming to this version of this Specification. Decoders conforming to this version of this Specification shall ignore SEI messages that contain reserved values of nnpfc_complexity_idc.

nnpfc_out_format_flag equal to 0 indicates that the sample values output by the post-processing filter are real numbers and the functions OutY and OutC for converting luma sample values and chroma sample values, respectively, output by the post-processing, to integer values at bit depths BitDepthY and BitDepthC, respectively, are specified as follows:

$$OutY(x) = Clip3(0, (1 \ll BitDepth_Y) - 1, \text{Round}\ (x * ((1 \ll BitDepth_Y) - 1))) \quad (81)$$

$$OutC(x) = Clip3(0, (1 \ll BitDepth_C) - 1, Round\ (x * ((1 \ll BitDepth_C) - 1))) \quad (82)$$

nnpfc_out_format_flag equal to 1 indicates that the sample values output by the post-processing filter are unsigned integer numbers and the functions OutY and OutC are specified as follows:

```
shift = outTensorBitDepth − BitDepthY
if( shift > 0 )
OutY( x ) = Clip3( 0, ( 1 << BitDepthY ) − 1, ( x + ( 1 << ( shift − 1 ) ) ) >> shift )
else
OutY( x ) = x << ( BitDepthY − outTensorBitDepth )          (83)
shift = outTensorBitDepth − BitDepthC
if( shift > 0 )
OutC( x )= Clip3( 0, ( 1 << BitDepthC ) − 1, ( x + ( 1 << ( shift − 1 ) ) ) >> shift )
else
OutC( x ) = x << ( BitDepthC − outTensorBitDepth )
```

The variable outTensorBitDepth is derived from the syntax element nnpfc_out_tensor_bitdepth_minus8 as described below. nnpfc_out_tensor_bitdepth_minus8 plus 8 specifies the bit depth of sample values in the output integer tensor. The value of outTensorBitDepth is derived as follows:

$$outTensorBitDepth = \text{nnpfc\_out\_tensor\_bitdepth\_minus8} + 8 \quad (84)$$

It is a requirement of bitstream conformance that the value of nnpfc_out_tensor_bitdepth_minus8 shall be in the range of 0 to 24, inclusive.

nnpfc_out_order_idc indicates the output order of samples resulting from the post-processing filter. Table 24 contains an informative description of nnpfc_out_order_idc values. The semantics of nnpfc_out_order_idc in the range of 0 to 3, inclusive, are specified in Table 25, which specifies a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc shall not be equal to 3. The value of nnpfc_out_order_idc shall be in the range of 0 to 255, inclusive. Values of nnpfc_out_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_out_order_idc.

TABLE 24

Informative description of nnpfc_out_order_idc values

| nnpfc_out order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the chroma format is 4:2:0. |
| 4 . . . 255 | reserved |

TABLE 25

Process for deriving sample values in the filtered output sample arrays FilteredYPic, FilteredCbPic, and FilteredCrPic from the output tensors outputTensor for a given vertical sample coordinate cTop and a horizontal sample coordinate cLeft specifying the top-left sample location for the patch of samples included in the input tensors

| nnpfc_out_ order_idc | Process StoreOutputTensors( ) for deriving sample values in the filtered picture from the output tensors |
|---|---|

0
```
for( yP = 0; yP < outPatchHeight; yP++)
  for( xP = 0; xP < outPatchWidth; xP++ ) {
    yY = cTop * outPatchHeight / inpPatchHeight + yP
    xY = cLeft * outPatchWidth / inpPatchWidth + xP
    if ( yY < nnpfc_pic_height_in_luma_samples && xY < nnpfc_pic_width_in_luma_samples )
      if( nnpfc_component_last_flag = = 0 )
        FilteredYPic[ xY ][yY ] = OutY( outputTensor[ 0 ][ 0 ][ yP ][ xP ] )
      else
        FilteredYPic[ xY ][ yY ] = OutY( outputTensor[ 0 ][ yP ][ xP ][ 0 ] )
  }
```

1
```
for( yP = 0; yP < outPatchCHeight; yP++)
  for( xP = 0; xP < outPatchCWidth; xP++ ) {
    xSrc = cLeft * horCScaling + xP
    ySrc = cTop * verCScaling + yP
    if ( ySrc < nnpfc_pic_height_in_luma_samples / outSubHeightC &&
        xSrc < nnpfc_pic_width_in_luma_samples / outSubWidthC )
      if( nnpfc_component_last_flag = = 0 ) {
        FilteredCbPic[ xSrc ][ ySrc ] = OutC( outputTensor[ 0 ][ 0 ][ yP ][ xP ] )
        FilteredCrPic[ xSrc ][ ySrc ] = OutC( outputTensor[ 0 ][ 1 ][ yP ][ xP ] )
      } else {
        FilteredCbPic[ xSrc ][ ySrc ] = OutC( outputTensor[ 0 ][ yP ][ xP ][ 0 ] )
        FilteredCrPic[ xSrc ][ ySrc ] = OutC( outputTensor[ 0 ][ yP ][ xP ][ 1 ] )
      }
  }
```

2
```
for( yP = 0; yP < outPatchHeight; yP++)
  for( xP = 0; xP < outPatchWidth; xP++ ) {
    yY = cTop * outPatchHeight / inpPatchHeight + yP
    xY = cLeft * outPatchWidth / inpPatchWidth + xP
    yC = yY / outSubHeightC
    xC = xY / outSubWidthC
    yPc = ( yP / outSubHeightC ) * outSubHeightC
    xPc = ( xP / outSubWidthC ) * outSubWidthC
    if ( yY < nnpfc_pic_height_in_luma_samples && xY < nnpfc_pic_width_in_luma_samples)
      if( nnpfc_component_last_flag = = 0 ) {
        FilteredYPic[ xY ][ yY ] = OutY( outputTensor[ 0 ][ 0 ][ yP ][ xP ] )
        FilteredCbPic[ xC ][ yC ] = OutC( outputTensor[ 0 ][ 1 ][ yPc ][ xPc ] )
        FilteredCrPic[ xC ][ yC ] = OutC( outputTensor[ 0 ][ 2 ][ yPc ][ xPc ] )
      } else {
        FilteredYPic[ xY ][ yY ] = OutY( outputTensor[ 0 ][ yP ][ xP ][ 0 ] )
        FilteredCbPic[ xC ][ yC ] = OutC( outputTensor[ 0 ][ yPc ][ xPc ][ 1 ] )
```

TABLE 25-continued

Process for deriving sample values in the filtered output sample arrays FilteredYPic, FilteredCbPic, and FilteredCrPic from the output tensors outputTensor for a given vertical sample coordinate cTop and a horizontal sample coordinate cLeft specifying the top-left sample location for the patch of samples included in the input tensors

| nnpfc_out_order_idc | Process StoreOutputTensors( ) for deriving sample values in the filtered picture from the output tensors |
|---|---|
| | FilteredCrPic[ xC ][ yC ] = OutC( outputTensor[ 0 ][ yPc ][ xPc ][ 2 ] )<br>}<br>} |
| 3 | for( yP = 0; yP < outPatchHeight; yP++ )<br>for( xP = 0; xP < outPatchWidth; xP++ ) {<br>ySrc = cTop / 2 * outPatchHeight / inpPatchHeight + yP<br>xSrc = cLeft / 2 * outPatchWidth / inpPatchWidth + xP<br>if ( ySrc < nnpfc_pic_height_in_luma_samples / 2 &&<br>xSrc < nnpfc_pic_width_in_luma_samples / 2 )<br>if( nnpfc_component_last_flag = = 0 ) {<br>FilteredYPic[ xSrc * 2 ][ ySrc * 2 ] = OutY( outputTensor[ 0 ][ 0 ][ yP ][ xP ] )<br>FilteredYPic[ xSrc * 2 + 1 ][ ySrc * 2 ] = OutY( outputTensor[ 0 ][ 1 ][ yP ][ xP ] )<br>FilteredYPic[ xSrc * 2 ][ ySrc * 2 + 1 ] = OutY( outputTensor[ 0 ][ 2 ][ yP ][ xP ] )<br>FilteredYPic[ xSrc * 2 + 1][ ySrc * 2 + 1 ] = OutY( outputTensor[ 0 ][ 3 ][ yP ][ xP ] )<br>FilteredCbPic[ xSrc ][ ySrc ] = OutC( outputTensor[ 0 ][ 4 ][ yP ][ xP ] )<br>FilteredCrPic[ xSrc ][ ySrc ] = OutC( outputTensor[ 0 ][ 5 ][ yP ][ xP ] )<br>} else {<br>FilteredYPic[ xSrc * 2 ][ ySrc * 2 ] = OutY( outputTensor[ 0 ][ yP ][ xP ][ 0 ] )<br>FilteredYPic[ xSrc * 2 + 1 ][ ySrc * 2 ] = OutY( outputTensor[ 0 ][ yP ][ xP ][ 1 ] )<br>FilteredYPic[ xSrc * 2 ][ ySrc * 2 + 1 ] = OutY( outputTensor[ 0 ][ yP ][ xP ][ 2 ] )<br>FilteredYPic[ xSrc * 2 + 1][ ySrc * 2 + 1 ] = OutY( outputTensor[ 0 ][ yP ][ xP ][ 3 ] )<br>FilteredCbPic[ xSrc ][ ySrc ] = OutC( outputTensor[ 0 ][ yP ][ xP ][ 4 ] )<br>FilteredCrPic[ xSrc ][ ySrc ] = OutC( outputTensor[ 0 ][ yP ][ xP ][ 5 ] )<br>}<br>} |
| 4..255 | reserved |

A base post-processing filter for a cropped decoded output picture picA is the filter that is identified by the first neural-network post-filter characteristics SEI message, in decoding order, that has a particular nnpfc_id value within a CLVS.

If there is another neural-network post-filter characteristics SEI message that has the same nnpfc_id value, has nnpfc_mode_idc equal to 1, has different content than the neural-network post-filter characteristics SEI message that defines the base post-processing filter, and pertains to the picture picA, the base post-processing filter is updated by decoding the ISO/IEC 15938-17 bitstream in that neural-network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter PostProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( nnpfc_inp_order_idc = = 0 )
for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1 )
for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 2 )
for( cTop = 0; cTop < CroppedHeight; cTop += inpPatchHeight)        (85)
    for( cLeft = 0; cLeft < CroppedWidth; cLeft += inpPatchWidth) {
      DeriveInputTensors( )
      outputTensor = PostProcessingFilter( inputTensor )
      StoreOutputTensors( )
```

-continued

```
    }
else if( nnpfc_inp_order_idc = = 3 )
for( cTop = 0; cTop < CroppedHeight; cTop += inpPatchHeight * 2 )
    for( cLeft = 0; cLeft < CroppedWidth; cLeft += inpPatchWidth * 2 ) {
        DeriveInputTensors( )
        outputTensor = PostProcessingFilter( inputTensor )
        StoreOutputTensors( )
    }
  nnpfc_reserved_zero_bit shall be equal to 0.
```

nnpfc_uri_tag[i] contains a NULL-terminated UTF-8 character string specifying a tag URI. The UTF-8 character string contains a URI, with syntax and semantics as specified in IETF RFC 4151, uniquely identifying the format and associated information about the neural network used as the post-processing filter specified by nnrpf_uri[i] values. NOTE 4—nnrpf_uri_tag[i] elements represent a 'tag' URI, which allows uniquely identifying the format of neural network data specified by nnrpf_uri[i] values without needing a central registration authority. nnpfc_uri[i] contains a NULL-terminated UTF-8 character string, as specified in IETF Internet Standard 63. The UTF-8 character string contains a URI, with syntax and semantics as specified in IETF Internet Standard 66, identifying the neural network information (e.g. data representation) used as the post-processing filter. nnpfc_payload_byte[i] contains the i-th byte of a bitstream conforming to ISO/IEC 15938-17. The byte sequence nnpfc_payload_byte[i] for all present values of i shall be a complete bitstream that conforms to ISO/IEC 15938-17.

nnpfc_parameter_type_idc equal to 0 indicates that the neural network uses only integer parameters. nnpfc_parameter_type_flag equal to 1 indicates that the neural network may use floating point or integer parameters. nnpfc_parameter_type_idc equal to 2 indicates that the neural network uses only binary parameters. nnpfc_parameter_type_idc equal to 3 is reserved for future specification by ITU-T|ISO/IEC and shall not be present in bitstreams conforming to this version of this Specification. Decoders conforming to this version of this Specification shall ignore SEI messages that contain reserved value of nnpfc_parameter_type_idc. nnpfc_log 2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log 2_parameter_bit_length_minus3 is not present the neural network does not use parameters of bit length greater than 1. nnpfc_num_parameters_idc indicates the maximum number of neural network parameters for the post processing filter in units of a power of 2048. nnpfc_num_parameters_idc equal to 0 indicates that the maximum number of neural network parameters is not specified. The value nnpfc_num_parameters_idc shall be in the range of 0 to 52, inclusive. Values of nnpfc_num_parameters_idc greater than 52 are reserved for future specification by ITU-T|ISO/IEC and shall not be present in bitstreams conforming to this version of this Specification. Decoders conforming to this version of this Specification shall ignore SEI messages that contain reserved values of nnpfc_num_parameters_idc. If the value of nnpfc_num_parameters_idc is greater than zero, the variable maxNumParameters is derived as follows:

$$maxNumParameters = (2048 \ll \text{nnpfc\_num\_parameters\_idc}) - 1 \quad (86)$$

It is a requirement of bitstream conformance that the number of neural network parameters of the post-processing filter shall be less than or equal to maxNumParameters. nnpfc_num_kmac_operations_idc greater than 0 specifies that the maximum number of multiply-accumulate operations per sample of the post-processing filter is less than or equal to nnpfc_num_kmac_operations_idc*1000. nnpfc_num_kmac_operations_idc equal to 0 specifies that the maximum number of multiply-accumulate operations of the network is not specified. The value of nnpfc_num_kmac_operations_idc shall be in the range of 0 to $2^{32}-1$, inclusive.

8.29 Neural-Network Post-Filter Activation SEI Message 8.29.1 Neural-Network Post-Filter Activation SEI Message Syntax

| | Descriptor |
|---|---|
| nn_post_filter_activation( payloadSize ) { | |
| nnpfa_id | ue(v) |
| } | |

8.29.2 Neural-Network Post-Filter Activation SEI Message Semantics

This SEI message specifies the neural-network post-processing filter that may be used for post-processing filtering for the current picture. The neural-network post-processing filter activation SEI message persists only for the current picture. NOTE—There may be several neural-network post-processing filter activation SuiEI messages present for the same picture, for example, when the post-processing filters are meant for different purposes or filter different colour components. nnpfa_id specifies that the neural-network post-processing filter specified by one or more neural-network post-processing filter characteristics SEI messages that pertain to the current picture and have nnpfc_id equal to nnfpa_id may be used for post-processing filtering for the current picture.

4. TECHNICAL PROBLEMS SOLVED BY DISCLOSED EMBODIMENTS

An example design for the neural-network post-filter characteristics (NNPFC) SEI message has the following problems.

First, only some neural-network post-filter purposes with upsampling capabilities are specified. However, in video applications, often downsampling is also employed, and like for upsampling, using neural-network filters for downsampling can also provide better performance than using other approaches. Therefore, there is a need to be able to signal neural-network filters with downsampling capabilities.

Second, no neural-network post-filter purposes with the combination of upsampling capabilities for the output picture size and downsampling for the chroma format, or vice versa, are specified.

5. A LISTING OF SOLUTIONS AND EMBODIMENTS

To solve the above-described problems, methods as summarized below are disclosed. The examples should be considered as examples to explain the general concepts and should not be interpreted in a narrow way. Furthermore, these examples can be applied individually or combined in any manner.

Example 1

A solution to the first problem is now described. In an example, one or more of the following new purposes are defined. In one example, a purpose for chroma format downsampling without changing the output picture size is defined, with changing the chroma format from the 4:4:4 chroma format to the 4:2:2 or 4:4:4 chroma format, or from the 4:2:2 chroma format to the 4:2:0 chroma format. In one example, a purpose for output picture size downsampling without changing the chroma format is defined, with decreasing of either or both of the width and height of the cropped decoded output picture. In one example, a purpose for both output picture size downsampling and chroma format downsampling is defined, with decreasing of either or both of the width and height of the cropped decoded output picture, and changing of the chroma format from the 4:4:4 chroma format to the 4:2:2 or 4:4:4 chroma format, or from the 4:2:2 chroma format to the 4:2:0 chroma format.

Example 2

A solution to the second problem is now described. In an example, one or more of the following new purposes are defined. In one example, a purpose for both output picture size downsampling and chroma format upsampling is defined, with decreasing of either or both of the width and height of the cropped decoded output picture, and changing the chroma format from the 4:2:0 chroma format to the 4:2:2 or 4:4:4 chroma format, or from the 4:2:2 chroma format to the 4:4:4 chroma format. In one example, a purpose for both output picture size upsampling and chroma format downsampling is defined, with increasing of either or both of the width and height of the cropped decoded output picture, and changing the chroma format from the 4:4:4 chroma format to the 4:2:2 or 4:4:4 chroma format, or from the 4:2:2 chroma format to the 4:2:0 chroma format.

Example 3

A solution to the first and second problem is now described. In an example, one or more of the following constrains are specified. When ChromaFormatIdc is equal to 0 (i.e., when the input chroma format is monochrome), the value of nnpfc_purpose shall not indicate a purpose that involves changing of the chroma format. When ChromaFormatIdc is equal to 1 (i.e., when the input chroma format is 4:2:0), the value of nnpfc_purpose shall not indicate a purpose that involves chroma format downsampling. When ChromaFormatIdc is equal to 3 (i.e., when the input chroma format is 4:4:4), the value of nnpfc_purpose shall not indicate a purpose that involves chroma format upsampling.

Example 4

A solution to the first and second problem is further described. In an example, for purposes involving chroma format upsampling, regardless of whether the output picture size changes, an indication of whether the variable outSubWidthC is derived to be equal to 2 or 1 is signaled. For purposes involving chroma format downsampling, regardless of whether the output picture size changes, an indication of whether the variable outSubHeightC is derived to be equal to 2 or 1 is signaled.

Example 5

A solution to the first and second problem is further described. In an example, for purposes involving changing the output picture size, the absolute increasements to the width and height, respectively, of the luma sample array of the picture resulting by applying the post-processing filter to a cropped decoded output picture are signaled.

In one example, the values of the increasements are signalled using ue(v)-coded syntax elements.

In one example, it is required that the value of the signaled absolute increasement to the width shall be in the range of 0 to CroppedWidth*M−1, inclusive, where M is an integer greater than 0. In one example, the value of M above is equal to 15. In one example, the value of M above is equal to a different integer value greater than 0, e.g., 1, 3, 7, 31, 63, 127, or 255.

In one example, it is required that the value of the signaled absolute increasement to the height shall be in the range of 0 to CroppedHeight*N−1, inclusive, where N is an integer greater than 0. In one example, the value of N above is equal to 15. In one example, the value of N above is equal to a different integer value greater than 0, e.g., 1, 3, 7, 31, 63, 127, or 255.

In one example, for purposes involving output picture size upsampling, the value of the width of the luma sample array of the picture resulting by applying the post-processing filter to a cropped decoded output picture is derived to be equal to the sum of the input output picture width, CroppedWidth, and the value of the signalled absolute increasement to the width, and the value of the height of the luma sample array of the picture resulting by applying the post-processing filter to a cropped decoded output picture is derived to be equal to the sum of the input output picture height, CroppedHeight, and the value of the signalled absolute increasement to the height.

In one example, for purposes involving output picture size downsampling, the value of the width of the luma sample array of the picture resulting by applying the post-processing filter to a cropped decoded output picture is derived to be equal to the difference between the input output picture width, CroppedWidth, and the value of the signalled absolute increasement to the width, and the value of the height of the luma sample array of the picture resulting by applying the post-processing filter to a cropped decoded output picture is derived to be equal to the difference between the input output picture height, CroppedHeight, and the value of the signalled absolute increasement to the height.

In one example, it is required that the value of the width and the value of the height derived above shall both be greater than 0. In one example, furthermore, it is required that the value of the width derived above shall be greater than or equal to CroppedWidth/(M+1), with M being equal to 1, 3, 7, 15, 31, 63, 127, or 255. In one example, furthermore, it is required that the value of the height derived above shall be greater than or equal to CroppedHeight/(N+1), with N being equal to 1, 3, 7, 15, 31, 63, 127, or 255.

In one example, for purposes not involving changing the output picture size, the value of the width of the luma sample array of the picture resulting by applying the post-processing filter to a cropped decoded output picture is derived to be equal to the input output picture width, CroppedWidth, and the value of the height of the luma sample array of the picture resulting by applying the post-processing filter to a cropped decoded output picture is derived to be equal to the input output picture height, CroppedHeight.

Example 6

A solution to the first and second problem is further described. In an example, for purposes involving changing the output picture size, regardless of whether the change is to become larger or smaller, the increasements to the width and height, respectively, of the luma sample array of the picture resulting by applying the post-processing filter to a cropped decoded output picture are signaled. Note that in this case the increasements can be positive and can also be negative.

In one example, the values of the increasements are signalled using se(v)-coded syntax elements.

In one example, it is required that the value of the signaled increasement to the width shall be in the range of −CroppedWidth+ValW to CroppedWidth*M−1, inclusive, where M is an integer greater than 0. In one example, the value of ValW above is equal to 1. In one example, the value of ValW above is equal to CroppedWidth/(M+1). In one example, the value of M above is equal to 15. In one example, the value of M above is equal to a different integer value greater than 0, e.g., 1, 3, 7, 31, 63, 127, or 255.

In one example, it is required that the value of the signaled increasement to the height shall be in the range of −CroppedHeight+ValH to CroppedHeight*N−1, inclusive, where N is an integer greater than 0. In one example, the value of ValH above is equal to 1. In one example, the value of ValH above is equal to CroppedHeight/(N+1). In one example, the value of N above is equal to 15. In one example, the value of N above is equal to a different integer value greater than 0, e.g., 1, 3, 7, 31, 63, 127, or 255.

In one example, for purposes involving changing the output picture size, the value of the width of the luma sample array of the picture resulting by applying the post-processing filter to a cropped decoded output picture is derived to be equal to the sum of the input output picture width, CroppedWidth, and the value of the signalled increasement to the width, and the value of the height of the luma sample array of the picture resulting by applying the post-processing filter to a cropped decoded output picture is derived to be equal to the sum of the input output picture height, CroppedHeight, and the value of the signalled increasement to the height.

In one example, for purposes not involving changing the output picture size, the value of the width of the luma sample array of the picture resulting by applying the post-processing filter to a cropped decoded output picture is derived to be equal to the input output picture width, CroppedWidth, and the value of the height of the luma sample array of the picture resulting by applying the post-processing filter to a cropped decoded output picture is derived to be equal to the input output picture height, CroppedHeight.

6. EMBODIMENTS

Below are some example embodiments for some of the disclosure items summarized in Examples 1-4 above in section 5.

Most relevant parts that have been added or modified are shown in bold font, and some of the deleted parts are shown in italicized bold fonts. There may be some other changes that are editorial in nature and thus not highlighted.

6.1 First Embodiment

This embodiment is for Examples 1-6 summarized above in Section 5.

8.28.1 Neural-Network Post-Filter Characteristics SEI Message Syntax

| | Descriptor |
|---|---|
| nn_post_filter_characteristics( payloadSize ) { | |
| nnpfc_id | ue(v) |
| nnpfc_mode_idc | ue(v) |
| nnpfc_purpose_and_formatting_flag | u(1) |
| if( nnpfc_purpose_and_formatting_flag ) { | |
| nnpfc_purpose | ue(v) |
| if( nnpfc_purpose == 2 \|\| nnpfc_purpose == 4 ) | |
| nnpfc_out_sub_c_flag | u(1) |
| if( nnpfc_purpose == 2 \|\| nnpfc_purpose == 4 \|\| nnpfc_purpose == 8 ) | |
| nnpfc_out_subwc_equalto2_flag | u(1) |
| else if( nnpfc_purpose == 5 \|\| nnpfc_purpose == 7 \|\| nnpfc_purpose == 9 ) | |
| nnpfc_out_subhc_equalto2_flag | u(1) |
| if( nnpfc_purpose == 3 \|\| nnpfc_purpose == 4 ) { | |
| nnpfc_pic_width_in_luma_samples | ue(v) |
| nnpfc_pic_height_in_luma_samples | ue(v) |
| } | |
| else if( nnpfc_purpose == 3 \|\| nnpfc_purpose == 4 \|\| nnpfc_purpose == 6 nnpfc_purpose == 7 \|\| nnpfc_purpose == 8 \|\| nnpfc_purpose == 9 ) { | |
| nnpfc_abs_delta_pic_width | ue(v) |
| nnpfc_abs_delta_pic_height | ue(v) |
| } | |

-continued

| | Descriptor |
|---|---|
| nnpfc_component_last_flag | u(1) |
| ... | u(1) |
| } | |
| } | |

8.28.2 Neural-Network Post-Filter Characteristics SEI Message Semantics

This SEI message specifies a neural network that may be used as a post-processing filter. The use of specified post-processing filters for specific pictures is indicated with neural-network post-filter activation SEI messages.

. . .

nnpfc_purpose indicates the purpose of post-processing filter as specified in Table 20. The value of nnpfc_purpose shall be in the range of 0 to 232−2, inclusive. Values of nnpfc_purpose that do not appear in Table 20 are reserved for future specification by ITU-T|ISO/IEC and shall not be present in bitstreams conforming to this version of this Specification. Decoders conforming to this version of this Specification shall ignore SEI messages that contain reserved values of nnpfc_purpose.

TABLE 20

Definition of nnpfc_purpose

| Value | Interpretation |
|---|---|
| 0 | Unknown or unspecified |
| 1 | Visual quality improvement, without changing the chroma format or the output picture size |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |
| 2 | Chroma format upsampling (changing the chroma format from the 4:2:0 chroma format to the 4:2:2 or 4:4:4 chroma format, or from the 4:2:2 chroma format to the 4:4:4 chroma format), without changing the output picture size |
| 3 | Output picture size upsampling (increasing either or both of the width and height of the cropped decoded output picture), without changing the chroma format |
| 4 | Output picture size upsampling and chroma format upsampling |
| 5 | Chroma format downsampling (changing the chroma format from the 4:4:4 chroma format to the 4:2:2 or 4:4:4 chroma format, or from the 4:2:2 chroma format to the 4:2:0 chroma format), without changing the output picture size |
| 6 | Output picture size downsampling (decreasing either or both of the width and height of the cropped decoded output picture), without changing the chroma format |
| 7 | Output picture size downsampling and chroma format downsampling |
| 8 | Output picture size downsampling and chroma format upsampling |
| 9 | Output picture size upsampling and chroma format downsampling |

NOTE 1 -
When a reserved value of nnpfc_purpose is taken into use in the future by ITU-T | ISO/IEC, the syntax of this SEI message could be extended with syntax elements whose presence is conditioned by nnpfc_purpose being equal to that value.

When SubWidthC is equal to 1 and SubHeightC is equal to 1, nnpfc_purpose shall not be equal to 2 or 4. When ChromaFormatIdc is equal to 0, the value of nnpfc_purpose shall not be equal to 2, 4, 5, 7, 8, or 9. When ChromaFormatIdc is equal to 1, the value of nnpfc_purpose shall not be equal to 5, 7, or 9. When ChromaFormatIdc is equal to 3, the value of nnpfc_purpose shall not be equal to 2, 4, or 8.

nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1. When nnpfc_out_sub_c_flag is not present, outSubWidthC is inferred to be equal to SubWidthC and outSubHeightC is inferred to be equal to SubHeightC. If SubWidthC is equal to 2 and SubHeightC is equal to 1, nnpfc_out_sub_c_flag shall not be equal to 0.

nnpfc_out_subwc_equalto2_flag equal to 1 specifies that outSubWidthC is equal to 2. nnpfc_out_subwc_equalto2_flag equal to 0 specifies that outSubWidthC is equal to 1. When ChromaFormatIdc is equal to 2 and nnpfc_out_subwc_equalto2_flag is present, the value of nnpfc_out_subwc_equalto2_flag shall be equal to 0.

nnpfc_out_sub_c_equalto2_flag equal to 1 specifies that outSubHeightC is equal to 2. nnpfc_out_sub_c_equalto2_flag equal to 0 specifies that outSubHeightC is equal to 1. When ChromaFormatIdc is equal to 2 and nnpfc_out_sub_c_equalto2_flag is present, the value of nnpfc_out_sub_c_equalto2_flag shall be equal to 1.

The variables outSubWidthC outSubHeightC are derived as follows:

```
if( nnpfc_purpose = = 2 || nnpfc_purpose = = 4 || nnpfc_purpose = = 8 ) {
      outSubWidthC = 1 + nnpfc_out_subwc_equalto2_flag
   outSubHeightC = 1
} else if( nnpfc_purpose = = 5 || nnpfc_purpose = = 7 || nnpfc_purpose = = 9 ) {
outSubWidthC = 2
   outSubHeightC = 1 + nnpfc_out_subhc_equalto2_flag
} else {
 outSubWidthC = SubWidthC
 outSubHeightC = SubHeightC
}
```

[0130] nnpfc_pic_width_in_luma_samples and nnpfc_pic_height_in_luma_samples specify the width and height, respectively, of the luma sample array of the picture resulting by applying the post-processing filter identified by nnpfc_id to a cropped decoded output picture. When nnpfc_pic_width_in_luma_samples and nnpfc_pic_height_in_luma_samples are not present, they are inferred to be equal to CroppedWidth and CroppedHeight, respectively.

nnpfc_abs_delta_pic_width and nnpfc_abs_delta_pic_height specify the absolute increasements to the width and height, respectively, of the luma sample array of the picture resulting by applying the post-processing filter identified by nnpfc_id to a cropped decoded output picture. When nnpfc_abs_delta_pic_width and nnpfc_abs_delta_pic_height are not present, they are both inferred to be equal to 0. The value of nnpfc_abs_delta_pic_width shall be in the range of 0 to CroppedWidth*15−1, inclusive. The value of nnpfc_abs_delta_pic_height shall be in the range of 0 to CroppedHeight*15−1, inclusive.

The variables nnpfcPicWdith and nnpfcPicHeight, specifying the width and height, respectively, of the luma sample array of the picture resulting by applying the post-processing filter identified by nnpfc_id to a cropped decoded output picture, are derived as follows:

```
if( nnpfc_purpose = = 3 || nnpfc_purpose = = 4 || nnpfc_purpose = = 9 ) {
   nnpfcPicWdith = CroppedWidth + nnpfc_abs_delta_pic_width
   nnpfcPicHeight = CroppedHeight + nnpfc_abs_delta_pic_height
} else ( nnpfc_purpose = = 6 || nnpfc_purpose = = 7 || nnpfc_purpose = = 8 ) {   (76)
   nnpfcPicWdith = CroppedWidth − nnpfc_abs_delta_pic_width
   nnpfcPicHeight = CroppedHeight − nnpfc_abs_delta_pic_height
} else {
nnpfcPicWdith = CroppedWidth
nnpfcPicHeight = CroppedHeight
}
```

It is a requirement of bitstream conformance that the value of nnpfcPicWdith shall be greater than or equal to CroppedWidth/16 and the value of nnpfcPicHeight shall be greater than or equal to CroppedHeight/16.

nnpfc_component_last_flag equal to 0 specifies that the second dimension in the input tensor inputTensor to the post-processing filter and the output tensor outputTensor resulting from the post-processing filter is used for the channel. nnpfc_component_last_flag equal to 1 specifies that the last dimension in the input tensor inputTensor to the post-processing filter and the output tensor outputTensor resulting from the post-processing filter is used for the channel.

. . .

nnpfc_overlap specifies the overlapping horizontal and vertical sample counts of adjacent input tensors of the post-processing filter. The value of nnpfc_overlap shall be in the range of 0 to 16383, inclusive.

The variables inpPatchWidth, inpPatchHeight, outPatchWidth, outPatchHeight, horCScaling, verCScaling, outPatchCWidth, outPatchCHeight, and overlapSize are derived as follows:

$$inpPatchWidth = \text{nnpfc\_patch\_width\_minus1} + 1$$

$$inpPatchHeight = \text{nnpfc\_patch\_height\_minus1} + 1$$

$$outPatchWidth = (\text{nnpfc\_pic\_width\_in\_luma\_samples}\ nnpfcPicWidth * inpPatchWidth) / CroppedWidth$$

-continued $$outPatchHeight = (\text{nnpfc\_pic\_height\_in\_luma\_samples}\ nnpfcPicHeight * inpPatchHeight) / CroppedHeight$$

$$horCScaling = SubWidthC / outSubWidthC$$

$$verCScaling = SubHeightC / outSubHeightC$$

$$outPatchCWidth = outPatchWidth * horCScaling$$

$$outPatchCHeight = outPatchHeight * verCScaling$$

$$overlapSize = \text{nnpfc\_overlap}$$

It is a requirement of bitstream conformance that outPatchWidth*CroppedWidth shall be equal to nnpfc_pic_width_in_luma_samples nnpfcPicWdith*inpPatchWidth and outPatchHeight*CroppedHeight shall be equal to nnpfc_pic_height_in_luma_samples nnpfcPicHeight.

. . .

nnpfc_out_order_idc indicates the output order of samples resulting from the post-processing filter. Table 24 contains an informative description of nnpfc_out_order_idc values. The semantics of nnpfc_out_order_idc in the range of 0 to 3, inclusive, are specified in Table 25, which specifies a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc shall not be equal to 3. The value of nnpfc_out_order_idc shall be in the range of 0 to 255, inclusive. Values of nnpfc_out_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_out_order_idc.

TABLE 24

Informative description of nnpfc_out_order_idc values

| nnpfc_out order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the chroma format is 4:2:0. |
| 4 . . . 255 | reserved |

TABLE 25

Process for deriving sample values in the filtered output sample arrays FilteredYPic, FilteredCbPic, and FilteredCrPic from the output tensors outputTensor for a given vertical sample coordinate cTop and a horizontal sample coordinate cLeft specifying the top-left sample location for the patch of samples included in the input tensors.

| nnpfc_out_order_idc | Process StoreOutputTensors( ) for deriving sample values in the filtered picture from the output tensors |
|---|---|

```
0          for( yP = 0; yP < outPatchHeight; yP++)
             for( xP = 0; xP < outPatchWidth; xP++ ) {
               yY = cTop * outPatchHeight / inpPatchHeight + yP
               xY = cLeft * outPatchWidth / inpPatchWidth + xP
               if ( yY < nnpfc_pic_height_in_luma_samples && xY <
           nnpfc_pic_width_in_luma_samples )
               if ( yY < nnpfcPicHeight && xY < nnpfcPicWdith )
                 if( nnpfc_component_last_flag = = 0 )
                   FilteredYPic[ xY ][yY ] = OutY( outputTensor[ 0 ][ 0 ][ yP ][ xP ] )
                 else
                   FilteredYPic[ xY ][ yY ] = OutY( outputTensor[ 0 ][ yP ][ xP ][ 0 ] )
             }
1          for( yP = 0; yP < outPatchCHeight; yP++)
             for( xP = 0; xP < outPatchCWidth; xP++ ) {
               xSrc = cLeft * horCScaling + xP
               ySrc = cTop * verCScaling + yP
               if ( ySrc < nnpfc_pic_height_in_luma_samples / outSubHeightC &&
                   xSrc < nnpfc_pic_width_in_luma_samples / outSubWidthC )
               if ( ySrc < nnpfcPicHeight / outSubHeightC &&
                   xSrc < nnpfcPicWdith / outSubWidthC )
                 if( nnpfc_component_last_flag = = 0 ) {
                   FilteredCbPic[ xSrc ][ ySrc ] = OutC( outputTensor[ 0 ][ 0 ][ yP ][ xP ] )
                   FilteredCrPic[ xSrc ][ ySrc ] = OutC( outputTensor[ 0 ][ 1 ][ yP ][ xP ] )
                 } else {
                   FilteredCbPic[ xSrc ][ ySrc ] = OutC( outputTensor[ 0 ][ yP ][ xP ][ 0 ] )
                   FilteredCrPic[ xSrc ][ ySrc ] = OutC( outputTensor[ 0 ][ yP ][ xP ][ 1 ] )
                 }
             }
2          for( yP = 0; yP < outPatchHeight; yP++)
             for( xP = 0; xP < outPatchWidth; xP++ ) {
               yY = cTop * outPatchHeight / inpPatchHeight + yP
               xY = cLeft * outPatchWidth / inpPatchWidth + xP
               yC = yY / outSubHeightC
               xC = xY / outSubWidthC
               yPc = ( yP / outSubHeightC ) * outSubHeightC
               xPc = ( xP / outSubWidthC ) * outSubWidthC
               if ( yY < nnpfc_pic_height_in_luma_samples && xY <
           nnpfc_pic_width_in_luma_samples )
               if ( yY < nnpfcPicHeight && xY < nnpfcPicWdith)
                 if( nnpfc_component_last_flag = = 0 ) {
                   FilteredYPic[ xY ][ yY ] = OutY( outputTensor[ 0 ][ 0 ][ yP ][ xP ] )
                   FilteredCbPic[ xC ][ yC ] = OutC( outputTensor[ 0 ][ 1 ][ yPc ][ xPc ] )
                   FilteredCrPic[ xC ][ yC ] = OutC( outputTensor[ 0 ][ 2 ][ yPc ][ xPc ] )
```

TABLE 25-continued

Process for deriving sample values in the filtered output sample arrays FilteredYPic, FilteredCbPic, and FilteredCrPic from the output tensors outputTensor for a given vertical sample coordinate cTop and a horizontal sample coordinate cLeft specifying the top-left sample location for the patch of samples included in the input tensors.

| nnpfc_out_order_idc | Process StoreOutputTensors( ) for deriving sample values in the filtered picture from the output tensors |
|---|---|
| | } else {<br>FilteredYPic[ xY ][ yY ] = OutY( outputTensor[ 0 ][ yP ][ xP ][ 0 ] )<br>FilteredCbPic[ xC ][ yC ] = OutC( outputTensor[ 0 ][ yPc ][ xPc ][ 1 ] )<br>FilteredCrPic[ xC ][ yC ] = OutC( outputTensor[ 0 ][ yPc ][ xPc ][ 2 ] )<br>}<br>} |
| 3 | for( yP = 0; yP < outPatchHeight; yP++ )<br>for( xP = 0; xP < outPatchWidth; xP++ ) {<br>ySrc = cTop / 2 * outPatchHeight / inpPatchHeight + yP<br>xSrc = cLeft / 2 * outPatchWidth / inpPatchWidth + xP<br>if ( ySrc < nnpfc_pic_height_in_luma_samples / 2 &&<br>xSrc < nnpfc_pic_width_in_luma_samples / 2 )<br>if ( ySrc < nnpfcPicHeight / 2 &&<br>xSrc < nnpfcPicWdith / 2 )<br>if( nnpfc_component_last_flag = = 0 ) {<br>FilteredYPic[ xSrc * 2 ][ ySrc * 2 ] = OutY( outputTensor[ 0 ][ 0 ][ yP ][ xP ] )<br>FilteredYPic[ xSrc * 2 + 1 ][ ySrc * 2 ] = OutY( outputTensor[ 0 ][ 1 ][ yP ][ xP ] )<br>FilteredYPic[ xSrc * 2 ][ ySrc * 2 + 1 ] = OutY( outputTensor[ 0 ][ 2 ][ yP ][ xP ] )<br>FilteredYPic[ xSrc * 2 + 1][ ySrc * 2 + 1 ] = OutY( outputTensor[ 0 ][ 3 ][ yP ][ xP ] )<br>FilteredCbPic[ xSrc ][ ySrc ] = OutC( outputTensor[ 0 ][ 4 ][ yP ][ xP ] )<br>FilteredCrPic[ xSrc ][ ySrc ] = OutC( outputTensor[ 0 ][ 5 ][ yP ][ xP ] )<br>} else {<br>FilteredYPic[ xSrc * 2 ][ ySrc * 2 ] = OutY( outputTensor[ 0 ][ yP ][ xP ][ 0 ] )<br>FilteredYPic[ xSrc * 2 + 1 ][ ySrc * 2 ] = OutY( outputTensor[ 0 ][ yP ][ xP ][ 1 ] )<br>FilteredYPic[ xSrc * 2 ][ ySrc * 2 + 1 ] = OutY( outputTensor[ 0 ][ yP ][ xP ][ 2 ] )<br>FilteredYPic[ xSrc * 2 + 1][ ySrc * 2 + 1 ] = OutY ( outputTensor[ 0 ][ yP ][ xP ][ 3 ] )<br>FilteredCbPic[ xSrc ][ ySrc ] = OutC( outputTensor[ 0 ][ yP ][ xP ][ 4 ] )<br>FilteredCrPic[ xSrc ][ ySrc ] = OutC( outputTensor[ 0 ][ yP ][ xP ][ 5 ] )<br>}<br>} |
| 4..255 | reserved |

A base post-processing filter for a cropped decoded output picture picA is the filter that is identified by the first neural-network post-filter characteristics SEI message, in decoding order, that has a particular nnpfc_id value within a CLVS.

If there is another neural-network post-filter characteristics SEI message that has the same nnpfc_id value, has nnpfc_mode_idc equal to 1, has different content than the neural-network post-filter characteristics SEI message that defines the base post-processing filter, and pertains to the picture picA, the base post-processing filter is updated by decoding the ISO/IEC 15938-17 bitstream in that neural-network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter PostProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( nnpfc_inp_order_idc = = 0 )
  for( cTop = 0; cTop < CroppedHeight; cTop += inpPatchHeight )
    for( cLeft = 0; cLeft < CroppedWidth; cLeft += inpPatchWidth ) {
        DeriveInputTensors( )
      outputTensor = PostProcessingFilter( inputTensor )
        StoreOutputTensors( )
    }
else if( nnpfc_inp_order_idc = = 1 )
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
        DeriveInputTensors( )
      outputTensor = PostProcessingFilter( inputTensor )
        StoreOutputTensors( )
    }
else if( nnpfc_inp_order_idc = = 2 )
  for( cTop = 0; cTop < CroppedHeight; cTop += inpPatchHeight)
    for( cLeft = 0; cLeft < CroppedWidth; cLeft += inpPatchWidth) {
        DeriveInputTensors( )
      outputTensor = PostProcessingFilter( inputTensor )
        StoreOutputTensors( )
    }
```

-continued

```
else if( nnpfc_inp_order_idc = = 3 )
  for( cTop = 0; cTop < CroppedHeight; cTop += inpPatchHeight * 2 )
    for( cLeft = 0; cLeft < CroppedWidth; cLeft += inpPatchWidth * 2 ) {
        DeriveInputTensors( )
      outputTensor = PostProcessingFilter( inputTensor )
        StoreOutputTensors( )
    }
...
```

7. REFERENCES

[1] ITU-T and ISO/IEC, "High efficiency video coding", Rec. ITU-T H.265 ISO/IEC 23008-2 (in force edition).

[2] J. Chen, E. Alshina, G. J. Sullivan, J.-R. Ohm, J. Boyce, "Algorithm description of Joint Exploration Test Model 7 (JEM7)," JVET-G1001, August 2017.

[3] Rec. ITU-T H.266|ISO/IEC 23090-3, "Versatile Video Coding", 2022.

[4] Rec. ITU-T Rec. H.274|ISO/IEC 23002-7, "Versatile Supplemental Enhancement Information Messages for Coded Video Bitstreams", 2022.

[5] S. McCarthy, T. Chujoh, M. Hannuksela, G. Sullivan, and Y.-K. Wang (editors), "Additional SEI messages for VSEI (Draft 2)," JVET output document JVET-AA2006, publicly available online herein: https://www.jvet-experts.org/doc_end_user/current_document.php?id=11947.

Figure 2:
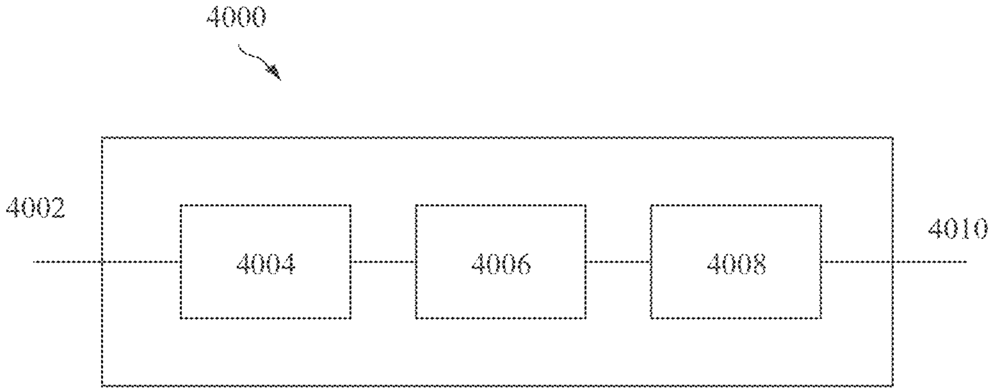
FIG. 2 is a block diagram showing an example video processing system.

FIG. 2 is a block diagram showing an example video processing system 4000 in which various embodiments disclosed herein may be implemented. Various implementations may include some or all of the components of the system 4000. The system 4000 may include input 4002 for receiving video content. The video content may be received in a raw or uncompressed format, e.g., 8- or 10-bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 3:
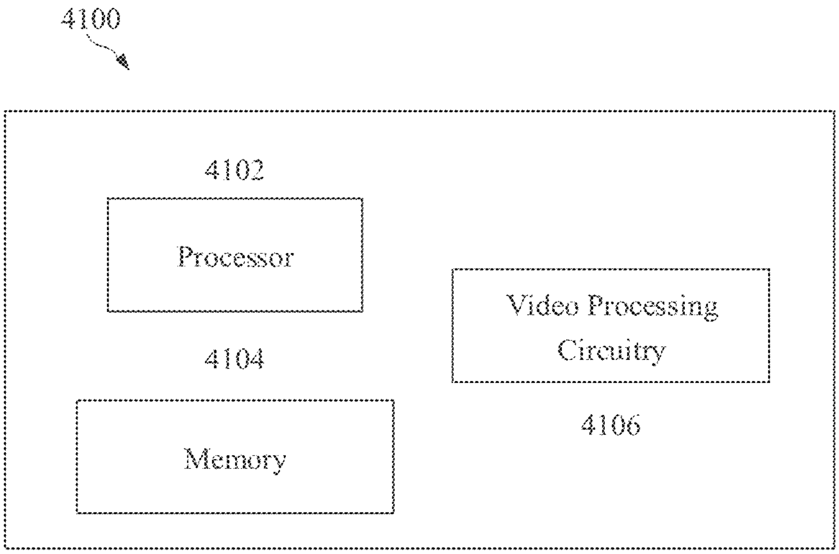
FIG. 3 is a block diagram of an example video processing apparatus.

FIG. 3 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and embodiments described herein. The video processing circuitry 4106 may be used to implement, in hardware circuitry, some embodiments described in the present disclosure. In some embodiments, the video processing circuitry 4106 may be at least partly included in the processor 4102, e.g., a graphics co-processor.

Figure 4:
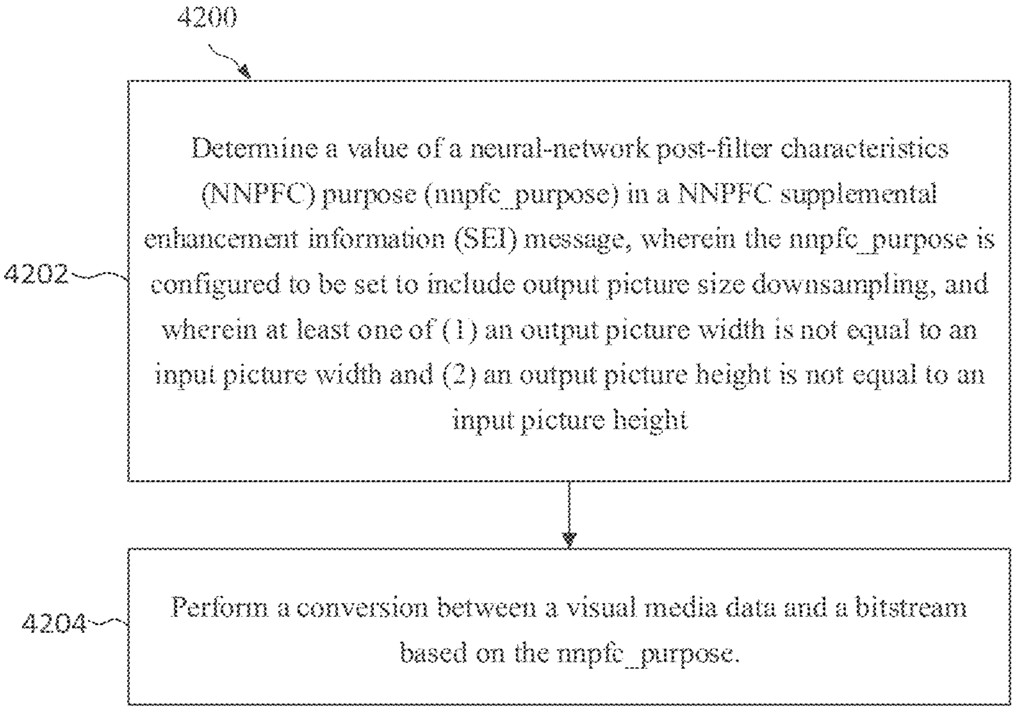
FIG. 4 is a flowchart for an example method of video processing.

FIG. 4 is a flowchart for an example method 4200 of video processing. The method 4200 may be implemented by, for example, the coding component 4004 of FIG. 2, the coding component 4008 of FIG. 2, or the video processing apparatus 4100 of FIG. 3. In block 4202, the method 4200 includes determining a value of a neural-network post-filter characteristics (NNPFC) purpose (nnpfc_purpose) in a NNPFC supplemental enhancement information (SEI) message, wherein the nnpfc_purpose is configured to be set to include output picture size downsampling, and wherein at least one of (1) an output picture width is not equal to an input picture width and (2) an output picture height is not equal to an input picture height. In block 4204, the method 4200 includes performing a conversion between a visual media data and a bitstream based on the nnpfc_purpose.

In an embodiment, the output picture width is less than the input picture width, wherein the output picture height is less than the input picture height, or both. In an embodiment, the input picture width is referred to as a cropped width and the input picture height is referred to as a cropped height. In an embodiment, the nnpfc_purpose is configured to be set to indicate chroma format downsampling without changing an output picture size.

In an embodiment, the chroma format downsampling comprises downsampling from a 4:4:4 chroma format to a 4:2:2 chroma format or a 4:2:0 chroma format. In an embodiment, the chroma format downsampling comprises downsampling from a 4:2:2 chroma format to a 4:2:0 chroma format.

In an embodiment, the nnpfc_purpose is configured to be set to indicate both the output picture size downsampling and the chroma format downsampling, wherein the output picture width is decreased relative to the input picture width, the output picture height is decreased relative to the input picture height, or both, and wherein the chroma format downsampling comprises downsampling from the 4:4:4 chroma format to the 4:2:2 chroma format, downsampling from the 4:4:4 chroma format to the 4:2:0 chroma format, or downsampling from the 4:2:2 chroma format to the 4:2:0 chroma format.

In an embodiment, the nnpfc_purpose is configured to be set to indicate both the output picture size downsampling and chroma format upsampling, wherein the output picture width is decreased relative to the input picture width, the output picture height is decreased relative to the input picture height, or both, and wherein the chroma format upsampling comprises upsampling from the 4:2:0 chroma format to the 4:2:2 chroma format, upsampling from the 4:2:0 chroma format to the 4:4:4 chroma format, or upsampling from the 4:2:2 chroma format to the 4:4:4 chroma format.

In an embodiment, the nnpfc_purpose is configured to be set to indicate both the output picture size upsampling chroma format downsampling, wherein the output picture width is increased relative to the input picture width, the output picture height is increased relative to the input picture height, or both, and wherein the chroma format downsampling comprises downsampling from the 4:4:4 chroma format to the 4:2:2 chroma format, downsampling from the 4:4:4 chroma format to the 4:2:0 chroma format, or downsampling from the 4:2:2 chroma format to the 4:2:0 chroma format.

In an embodiment, the NNPFC SEI message includes a chroma format indicator (ChromaFormatIdc), wherein a value of the nnpfc_purpose does not indicate a purpose that involves changing the chroma format when the ChromaFormatIdc is equal to 0, and wherein the ChromaFormatIdc is equal to 0 indicates an input chroma format is monochrome.

In an embodiment, the NNPFC SEI message includes a chroma format indicator (ChromaFormatIdc), wherein a value of the nnpfc_purpose does not indicate a purpose that involves the chroma format downsampling when the ChromaFormatIdc is equal to 1, and wherein the ChromaFormatIdc is equal to 1 indicates an input chroma format is the 4:2:0 chroma format.

In an embodiment, the NNPFC SEI message includes a chroma format indicator (ChromaFormatIdc), wherein a value of the nnpfc_purpose does not indicate a purpose that involves chroma format upsampling when the ChromaFormatIdc is equal to 3, and wherein the ChromaFormatIdc is equal to 3 indicates an input chroma format is the 4:4:4 chroma format.

In an embodiment, the bitstream includes an indication to indicate whether a variable output chroma component block width (outSubWidthC) is derived to be equal to 2 or 1 for purposes involving the chroma format upsampling regardless of whether the output picture size is changed.

In an embodiment, the bitstream includes an indication to indicate whether a variable output chroma component block height (outSubHeightC) is derived to be equal to 2 or 1 for purposes involving the chroma format downsampling regardless of whether the output picture size is changed.

In an embodiment, the bitstream includes an indication to indicate an absolute increase to a width and an absolute increase to a height of a luma sample array of a picture resulting from application of a post-processing filter to a cropped decoded output picture for purposes involving changing the output picture size.

In an embodiment, the absolute increase to the width and the absolute increase to the height are specified using coded unsigned integer variable (ue(v)) syntax.

In an embodiment, a value of the absolute increase to the width of the luma sample array shall be in the range of 0 to input output picture width (CroppedWidth)*M−1, inclusive, where M is an integer greater than 0. In an embodiment, a value of M is equal to 15. In an embodiment, a value of M is equal to 1, 3, 7, 15, 31, 63, 127, or 255.

In an embodiment, a value of the absolute increase to the height of the luma sample array shall be in the range of 0 to input output picture height (CroppedHeight)*N−1, inclusive, where N is an integer greater than 0. In an embodiment, a value of N is equal to 15. In an embodiment, a value of N is 1, 3, 7, 15, 31, 63, 127, or 255.

In an embodiment, a value of a width of a luma sample array of a picture resulting from applying a post-processing filter to a cropped decoded output picture is derived to be equal to a sum of CroppedWidth and a value of the absolute increase to the width for purposes involving output picture size upsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size upsampling.

In an embodiment, a value of a width of a luma sample array of a picture resulting from applying a post-processing filter to a cropped decoded output picture is derived to be equal to a sum of CroppedWidth and a value of the absolute increase to the width for purposes involving output picture size downsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size downsampling.

In an embodiment, the value of the width of the luma sample array and the value of the height of the luma sample array are both greater than zero. In an embodiment, the value of the width of the luma sample array is greater than or equal to the CroppedWidth/(M+1), where M is equal to 1, 3, 7, 15, 31, 63, 127, or 255. In an embodiment, the value of the width of the luma sample array is greater than or equal to the CroppedHeight/(N+1), where N is equal to 1, 3, 7, 15, 31, 63, 127, or 255.

In an embodiment, a value of a width of a luma sample array of a picture resulting by applying a post-processing filter to a cropped decoded output picture is derived to be equal to CroppedWidth for purposes not involving changing output picture size, and wherein a value of a height of a luma sample array of the picture resulting by applying the post-processing filter to the cropped decoded output picture is derived to be equal to the CroppedHeight for purposes not involving changing output picture size.

In an embodiment, the bitstream includes an indication to indicate increases to a width and a height of a luma sample array of a picture resulting by applying a post-processing filter to a cropped decoded output picture for purposes involving changing an output picture size.

In an embodiment, the increase to the width and the increase to the height are specified using coded unsigned integer variable (ue(v)) syntax. In an embodiment, the increase to the width is in the range of −CroppedWidth+width value (ValW) to CroppedWidth*M−1, inclusive, where M is an integer greater than 0. In an embodiment, a value of the width value (ValW) is 1.

In an embodiment, a value of the width value (ValW) is equal to CroppedWidth/(M+1). In an embodiment, a value of M is equal to 15. In an embodiment, a value of M is 1, 3, 7, 15, 31, 63, 127, or 255.

In an embodiment, the increase to the height is in the range of −CroppedHeight+height value (ValH) to CroppedHeight*N−1, inclusive, where N is an integer greater than 0. In an embodiment, a value of the width value (ValW) is 1. In an embodiment, a value of the width value (ValW) is equal to CroppedWidth/(M+1). In an embodiment, a value of M is equal to 15. In an embodiment, a value of M is 1, 3, 7, 15, 31, 63, 127, or 255.

In an embodiment, a value of a width of a luma sample array of a picture resulting by applying a post-processing filter to a cropped decoded output picture is derived to be equal to a sum of CroppedWidth and a value of the increase to the width for purposes involving changing output picture size, and wherein a value of a height of the luma sample array of the picture resulting by applying the post-processing filter to the cropped decoded output picture is derived to be equal to a sum of CroppedHeight and a value of the increase to the height for purposes involving changing output picture size.

In an embodiment, a value of a width of a luma sample array of a picture resulting by applying a post-processing filter to a cropped decoded output picture is derived to be equal to CroppedWidth for purposes not involving changing output picture size, and wherein a value of a height of the luma sample array of the picture resulting by applying the post-processing filter to a cropped decoded output picture is derived to be equal to CroppedHeight for purposes not involving changing output picture size.

In another embodiment, a method includes determining a value of a neural-network post-filter characteristics (NNPFC) purpose (nnpfc_purpose) in a NNPFC SEI message. The nnpfc_purpose can be set to indicate chroma format downsampling without changing an output picture size by changing a chroma format. A conversion is performed between a visual media data and a bitstream based on the nnpfc_purpose.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 5:
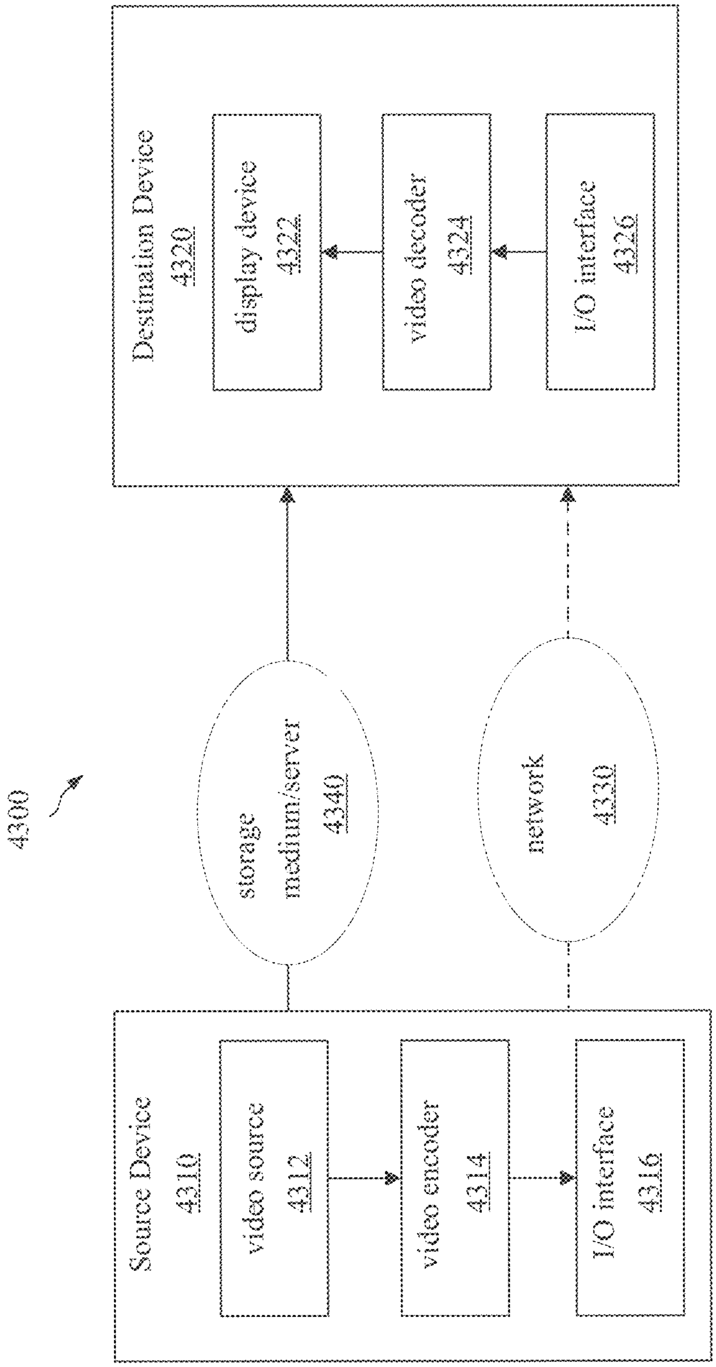
FIG. 5 is a block diagram that illustrates an example video coding system.

FIG. 5 is a block diagram that illustrates an example video coding system 4300 that may utilize the embodiments of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 6:
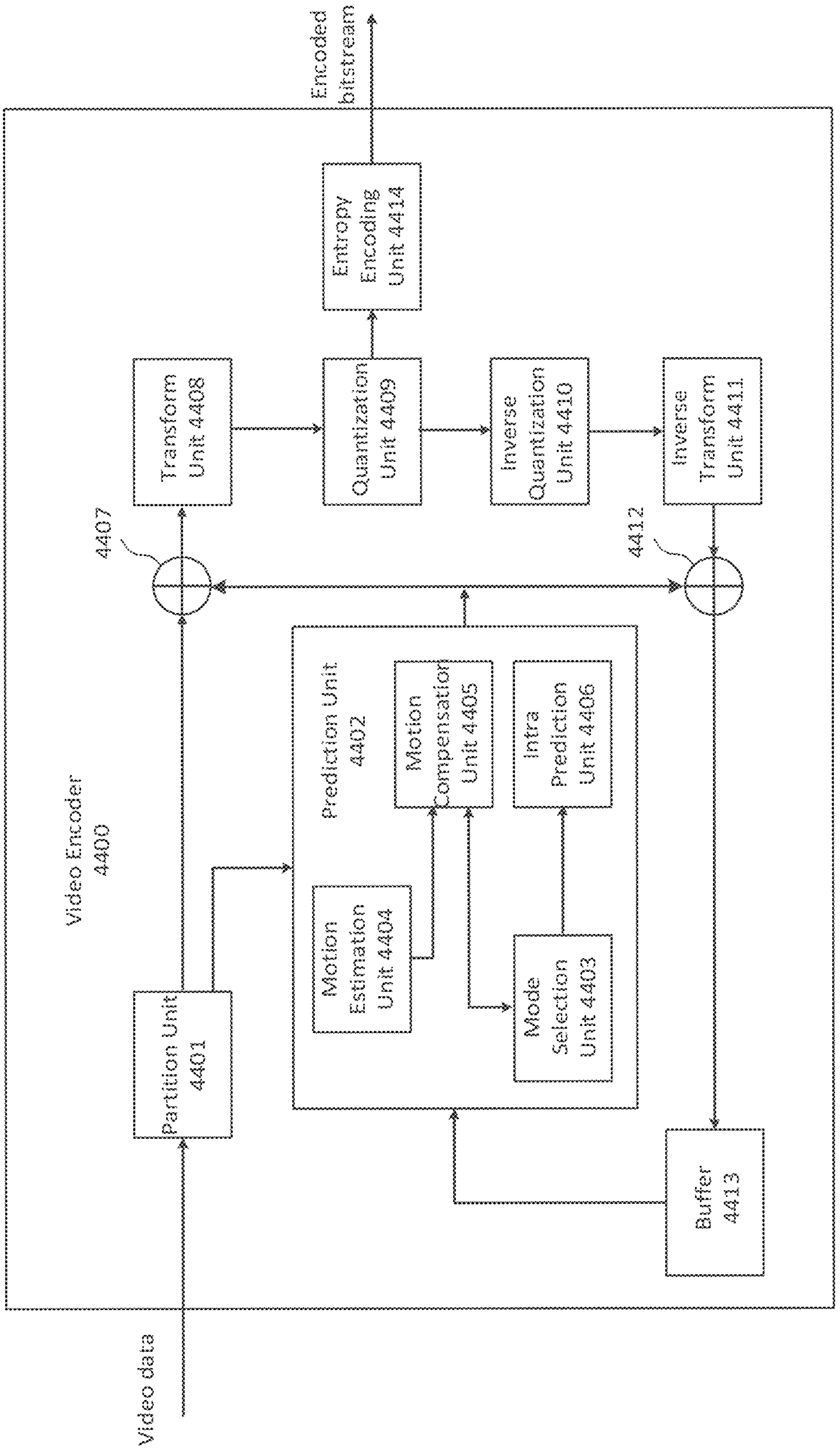
FIG. 6 is a block diagram that illustrates an example encoder.

FIG. 6 is a block diagram illustrating an example of video encoder 4400, which may be video encoder 4314 in the system 4300 illustrated in FIG. 5. Video encoder 4400 may be configured to perform any or all of the embodiments of this disclosure. The video encoder 4400 includes a plurality of functional components. The embodiments described in this disclosure may be shared among the various components of video encoder 4400. In some examples, a processor may be configured to perform any or all of the embodiments described in this disclosure.

The functional components of video encoder 4400 may include a partition unit 4401; a prediction unit 4402, which may include a mode select unit 4403, a motion estimation unit 4404, a motion compensation unit 4405, and an intra prediction unit 4406; a residual generation unit 4407; a transform processing unit 4408; a quantization unit 4409; an inverse quantization unit 4410; an inverse transform unit 4411; a reconstruction unit 4412; a buffer 4413; and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 7:
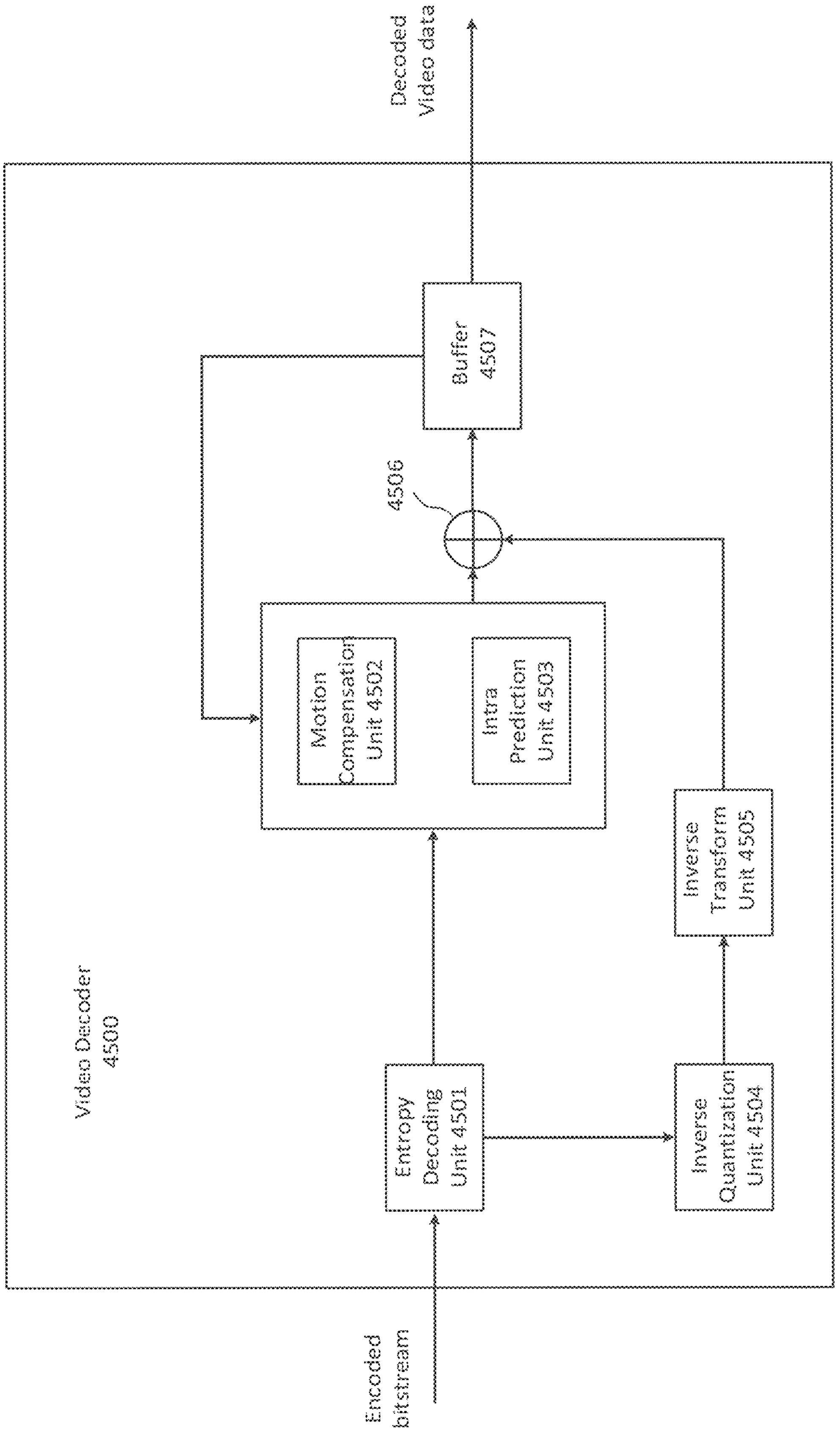
FIG. 7 is a block diagram that illustrates an example decoder.

FIG. 7 is a block diagram illustrating an example of video decoder 4500 which may be video decoder 4324 in the system 4300 illustrated in FIG. 5. The video decoder 4500 may be configured to perform any or all of the embodiments of this disclosure. In the example shown, the video decoder 4500 includes a plurality of functional components. The embodiments described in this disclosure may be shared among the various components of the video decoder 4500. In some examples, a processor may be configured to perform any or all of the embodiments described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 8:
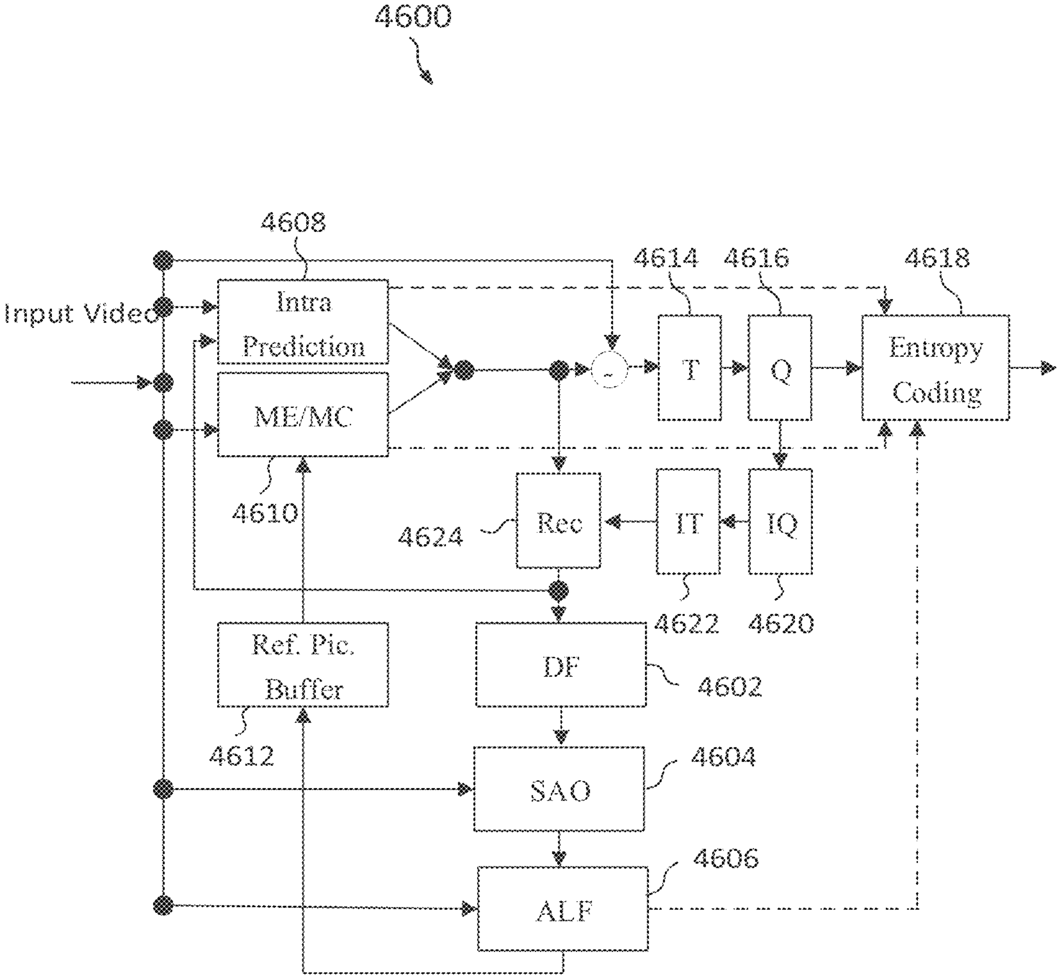
FIG. 8 is a schematic diagram of an example encoder.

FIG. 8 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of embodiments discussed herein.

1. A method for processing media data comprising: determining a value of a neural-network post-filter characteristics (NNPFC) purpose (nnpfc_purpose) in a NNPFC SEI message, wherein the nnpfc_purpose can be set to indicate chroma format downsampling without changing an output picture size by changing a chroma format; and performing a conversion between a visual media data and a bitstream based on the nnpfc_purpose.

2. The method of solution 1, wherein the nnpfc_purpose can be set to indicate output picture size downsampling without changing the chroma format by decreasing a width of a cropped decoded output picture, a height of the cropped decoded output picture, or both.

3. The method of any of solutions 1-2, wherein the nnpfc_purpose can be set to indicate both output picture size downsampling and chroma format downsampling by decreasing a width of a cropped decoded output picture, a height of the cropped decoded output picture, or both, and changing of a chroma format.

4. The method of any of solutions 1-3, wherein the nnpfc_purpose can be set to indicate both output picture size downsampling and chroma format upsampling by decreasing a width of a cropped decoded output picture, a height of the cropped decoded output picture, or both, and changing of a chroma format.

5. The method of any of solutions 1-4, wherein the nnpfc_purpose can be set to indicate both output picture size upsampling and chroma format downsampling by increasing a width of a cropped decoded output picture, a height of the cropped decoded output picture, or both, and changing of a chroma format.

6. The method of any of solutions 1-5, wherein the NNPFC SEI message is constrained such that: when ChromaFormatIdc is equal to 0, the value of nnpfc_purpose shall not indicate a purpose that involves changing of chroma format; when ChromaFormatIdc is equal to 1, the value of nnpfc_purpose shall not indicate a purpose that involves chroma format downsampling; and when ChromaFormatIdc is equal to 3, the value of nnpfc_purpose shall not indicate a purpose that involves chroma format upsampling.

7. The method of any of solutions 1-6, wherein an indication is signaled in the bitstream to indicate whether a variable output chroma component block width (outSubWidthC) is derived to be equal to 2 or 1 for purposes involving chroma format upsampling regardless of whether an output picture size is changed.

8. The method of any of solutions 1-7, wherein an indication is signaled in the bitstream to indicate whether a variable output chroma component block height (outSubHeightC) is derived to be equal to 2 or 1 for purposes involving chroma format downsampling regardless of whether an output picture size is changed.

9. The method of any of solutions 1-8, wherein an indication is signaled in the bitstream to indicate an absolute increase to a width and an absolute increase to a height of a luma sample array of a picture resulting from application of a post-processing filter to a cropped decoded output picture for purposes involving changing an output picture size.

10. The method of any of solutions 1-9, wherein a value of the absolute increase to the width shall be in the range of 0 to input output picture width (CroppedWidth)*M−1, inclusive, where M is an integer greater than 0.

11. The method of any of solutions 1-10, wherein M is an integer value of 1, 3, 7, 15, 31, 63, 127, or 255.

12. The method of any of solutions 1-11, wherein a value of the absolute increase to the height shall be in the range of 0 to input output picture height (CroppedHeight)*N−1, inclusive, where N is an integer greater than 0.

13. The method of any of solutions 1-12, wherein N is an integer value of 1, 3, 7, 15, 31, 63, 127, or 255.

14. The method of any of solutions 1-13, wherein a value of a width of a luma sample array of a picture resulting from applying a post-processing filter to a cropped decoded output picture is derived to be equal to a sum of CroppedWidth and a value of the absolute increase to the width for purposes involving output picture size upsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size upsampling.

15. The method of any of solutions 1-14, wherein a value of a width of a luma sample array of a picture resulting from applying a post-processing filter to a cropped decoded output picture is derived to be equal to a sum of CroppedWidth and a value of the absolute increase to the width for purposes involving output picture size downsampling, and wherein a value of a height of a luma sample array of a picture resulting from applying a post-processing filter to a cropped decoded output picture is derived to be equal to a sum of CroppedHeight and a value of the absolute increase to the height for purposes involving output picture size downsampling.

16. The method of any of solutions 1-15, wherein a value of a width of a luma sample array of a picture resulting by applying a post-processing filter to a cropped decoded output picture is derived to be equal to CroppedWidth for purposes not involving changing output picture size, and wherein a value of a height of a luma sample array of the picture resulting by applying the post-processing filter to the cropped decoded output picture is derived to be equal to the CroppedHeight for purposes not involving changing output picture size.

17. The method of any of solutions 1-16, wherein an indication is signaled in the bitstream to indicate increases to a width and a height of a luma sample array of a picture resulting by applying a post-processing filter to a cropped decoded output picture for purposes involving changing an output picture size.

18. The method of any of solutions 1-17, wherein the increase to the width is in the range of −CroppedWidth+width value (ValW) to CroppedWidth*M−1, inclusive, where M is an integer greater than 0.

19. The method of any of solutions 1-18, wherein the increase to the height is in the range of −CroppedHeight+height value (ValH) to CroppedHeight*N−1, inclusive, where N is an integer greater than 0.

20. The method of any of solutions 1-19, wherein a value of a width of a luma sample array of a picture resulting by applying a post-processing filter to a cropped decoded output picture is derived to be equal to a sum of CroppedWidth and a value of the increase to the width for purposes involving changing output picture size, and wherein a value of a height of the luma sample array of the picture resulting by applying the post-processing filter to the cropped decoded output picture is derived to be equal to a sum of CroppedHeight and a value of the increase to the height for purposes involving changing output picture size.

21. The method of any of solutions 1-20, wherein a value of a width of a luma sample array of a picture resulting by applying a post-processing filter to a cropped decoded output picture is derived to be equal to CroppedWidth for purposes not involving changing output picture size, and wherein a value of a height of the luma sample array of the picture resulting by applying the post-processing filter to a cropped decoded output picture is derived to be equal to CroppedHeight for purposes not involving changing output picture size.

22. An apparatus for processing video data comprising: a processor; and a non-transitory memory with instructions thereon, wherein the instructions upon execution by the processor, cause the processor to perform the method of any of solutions 1-21.

23. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-21.

24. A non-transitory computer-readable recording medium storing a bitstream of a video which is generated by a method performed by a video processing apparatus, wherein the method comprises: determining a value of a neural-network post-filter characteristics (NNPFC) purpose (nnpfc_purpose) in a NNPFC SEI message, wherein the nnpfc_purpose can be set to indicate chroma format downsampling without changing an output picture size by changing a chroma format; and generating a bitstream based on the determining.

25. A method for storing bitstream of a video comprising: determining a value of a neural-network post-filter characteristics (NNPFC) purpose (nnpfc_purpose) in a NNPFC SEI message, wherein the nnpfc_purpose can be set to indicate chroma format downsampling without changing an output picture size by changing a chroma format; and generating a bitstream based on the determining; and storing the bitstream in a non-transitory computer-readable recording medium.

26. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing visual media data, comprising:

performing a conversion between visual media data comprising a current picture to which a filtering process using a neural-network post-filter (NNPF) is applied and a bitstream of the visual media data according to a rule;

wherein the rule specifies that a neural-network post-filter characteristics (NNPFC) purpose is included in a NNPFC supplemental enhancement information (SEI) message, wherein a first value of the NNPFC purpose indicates a purpose of the NNPF comprises increasing or decreasing a width or a height of the current picture, and wherein the rule specifies that when a chroma format indicator is equal to 3 indicating a 4:4:4 chroma format, a value of a chroma upsampling flag is equal to zero.

2. The method of claim 1, wherein when the NNPFC purpose has the first value, at least one the following conditions is true:

a) a width of an NNPF generated picture for the current picture is not equal to the width of the current picture; or b) a height of an NNPF generated picture for the current picture is not equal to the height of the current picture.

3. The method of claim 1, wherein the value of the chroma upsampling flag equal to zero indicates that the NNPFC purpose does not indicate the purpose of the NNPF to include chroma upsampling.

4. The method of claim 1, wherein the value of the chroma upsampling flag equal to one indicates that the NNPFC purpose indicates the purpose of the NNPF to include chroma upsampling.

5. The method of claim 1, wherein the rule specifies that a second value of the NNPFC purpose indicates the purpose of the NNPF comprises chroma upsampling for the current picture.

6. The method of claim 5, wherein the chroma upsampling comprises upsampling from a 4:2:0 chroma format to a 4:2:2 chroma format or a 4:4:4 chroma format.

7. The method of claim 5, wherein the chroma upsampling comprises upsampling from a 4:2:2 chroma format to a 4:4:4 chroma format.

8. The method of claim 5, wherein when the NNPFC purpose has the second value, a value of a chroma upsampling flag is equal to one.

9. The method of claim 1, wherein the conversion includes encoding the visual media data into the bitstream.

10. The method of claim 1, wherein the conversion includes decoding the visual media data from the bitstream.

11. An apparatus for processing visual media data comprising: a processor; and a non-transitory memory with instructions thereon, wherein the instructions upon execution by the processor, cause the processor to:

perform a conversion between visual media data comprising a current picture to which a filtering process using a neural-network post-filter (NNPF) is applied and a bitstream of the visual media data according to a rule, wherein the rule specifies that a neural-network post-filter characteristics (NNPFC) purpose is included in an NNPFC supplemental enhancement information (SEI) message, wherein a first value of the NNPFC purpose indicates a purpose of the NNPF comprises increasing or decreasing a width or a height of the current picture, and wherein the rule specifies that when a chroma format indicator is equal to 3 indicating a 4:4:4 chroma format, a value of a chroma upsampling flag is equal to zero.

12. The apparatus of claim 11, wherein when the NNPFC purpose has the first value, at least one the following conditions is true:

a) a width of an NNPF generated picture for the current picture is not equal to the width of the current picture; or b) a height of an NNPF generated picture for the current picture is not equal to the height of the current picture.

13. The apparatus of claim 11, wherein the value of the chroma upsampling flag equal to zero indicates that the NNPFC purpose does not indicate the purpose of the NNPF to include chroma upsampling.

14. A non-transitory computer-readable storage medium storing instructions that cause a processor to:

perform a conversion between visual media data comprising a current picture to which a filtering process using a neural-network post-filter (NNPF) is applied and a bitstream of the visual media data according to a rule, wherein the rule specifies that a neural-network post-filter characteristics (NNPFC) purpose is included in an NNPFC supplemental enhancement information (SEI) message, wherein a first value of the NNPFC purpose indicates a purpose of the NNPF comprises increasing or decreasing a width or a height of the current picture, and wherein the rule specifies that when a chroma format indicator is equal to 3 indicating a 4:4:4 chroma format, a value of a chroma upsampling flag is equal to zero.

15. The non-transitory computer-readable storage medium of claim 14, wherein when the NNPFC purpose has the first value, at least one the following conditions is true:

a) a width of an NNPF generated picture for the current picture is not equal to the width of the current picture; or b) a height of an NNPF generated picture for the current picture is not equal to the height of the current picture.

16. The non-transitory computer-readable storage medium of claim 14, wherein the value of the chroma upsampling flag equal to zero indicates that the NNPFC purpose does not indicate the purpose of the NNPF to include chroma upsampling.

17. The non-transitory computer-readable storage medium of claim 14, wherein the value of the chroma upsampling flag equal to one indicates that the NNPFC purpose indicates the purpose of the NNPF to include chroma upsampling.

18. The non-transitory computer-readable storage medium of claim 14, wherein the rule specifies that a second value of the NNPFC purpose indicates the purpose of the NNPF comprises chroma upsampling for the current picture.

19. A method for storing a bitstream of visual media data comprising:

generating the bitstream of the visual media data comprising a current picture to which a filtering process using a neural-network post-filter (NNPF) is applied according to a rule; and storing the bitstream in a non-transitory computer-readable recording medium, wherein the rule specifies that a neural-network post-filter characteristics (NNPFC) purpose is included in an NNPFC supplemental enhancement information (SEI) message, wherein a first value of the NNPFC purpose indicates a purpose of the NNPF comprises increasing or decreasing a width or a height of a current picture to which a filtering process using a neural-network post-filter (NNPF) is applied, and wherein the rule specifies that when a chroma format indicator is equal to 3 indicating a 4:4:4 chroma format, a value of a chroma upsampling flag is equal to zero.

20. The method of claim 19, wherein when the NNPFC purpose has the first value, at least one the following conditions is true:

a) a width of an NNPF generated picture for the current picture is not equal to the width of the current picture; or b) a height of an NNPF generated picture for the current picture is not equal to the height of the current picture.

* * * * *